United States Patent
Sabapathy et al.

(10) Patent No.: US 12,361,228 B2
(45) Date of Patent: Jul. 15, 2025

(54) NATURAL LANGUAGE PROCESSING TECHNIQUES FOR MACHINE-LEARNING-GUIDED SUMMARIZATION USING HYBRID CLASS TEMPLATES

(71) Applicant: UnitedHealth Group Incorporated, Minnetonka, MN (US)

(72) Inventors: Rajesh Sabapathy, Haryana (IN); Chirag Mittal, Haryana (IN); Gourav Awasthi, Haryana (IN); Aditya Teja Josyula, Collierville, TN (US); Ankur Gulati, Haryana (IN); Lubna Khan, Centerville, GA (US); Tarun Bansal, Punjab (IN)

(73) Assignee: UnitedHealth Group Incorporated, Minnetonka, MN (US)

(*) Notice: Subject to any disclaimer, the term of this patent is extended or adjusted under 35 U.S.C. 154(b) by 238 days.

(21) Appl. No.: 17/938,089

(22) Filed: Oct. 5, 2022

(65) Prior Publication Data

US 2023/0385557 A1    Nov. 30, 2023

Related U.S. Application Data

(60) Provisional application No. 63/365,340, filed on May 26, 2022.

(51) Int. Cl.
*G06F 40/40* (2020.01)
*G06F 16/34* (2019.01)
*G06F 40/186* (2020.01)

(52) U.S. Cl.
CPC .............. *G06F 40/40* (2020.01); *G06F 16/345* (2019.01); *G06F 40/186* (2020.01)

(58) Field of Classification Search
CPC ....... G06F 40/40; G06F 16/345; G06F 40/186
(Continued)

(56) References Cited

U.S. PATENT DOCUMENTS

| 6,996,414 B2 | 2/2006 | Vishwanathan et al. |
| 7,318,031 B2 | 1/2008 | Bantz et al. |

(Continued)

FOREIGN PATENT DOCUMENTS

| EP | 3839850 A1 * | 6/2021 | ......... G06F 16/3329 |
| KR | 20220154592 A * | 12/2021 | ............. G06Q 10/10 |

OTHER PUBLICATIONS

"Summarize Text With The Extractive Summarization API," Azure Cognitive Services|Microsoft Docs, Mar. 16, 2022, (6 pages) [Retrieved from the Internet May 4, 2022] <URL: https://docs.microsoft.com/en-us/azure/cognitive-services/language-service/text-summarization/how-to/call-api>.

(Continued)

*Primary Examiner* — Bharatkumar S Shah
(74) *Attorney, Agent, or Firm* — Alston & Bird LLP

(57) ABSTRACT

As described herein, various embodiments of the present invention provide methods, apparatus, systems, computing devices, computing entities, and/or the like for performing natural language processing operations for generating guided summaries using summarization templates that are mapped to hybrid classes of a hybrid classification space for a hybrid classification machine learning model. In some embodiments, by using summarization templates, a proposed summarization framework is able to vastly reduce the computational complexity of performing summarization on an input document data object, such as an input multi-party communication transcript data object, by defining the set of dynamic data fields that apply to the input document data (Continued)

object based at least in part on an assigned class/category of the input document data object.

20 Claims, 11 Drawing Sheets

(58) Field of Classification Search
USPC .......................................................... 704/9
See application file for complete search history.

(56) References Cited

U.S. PATENT DOCUMENTS

| | | |
|---|---|---|
| 7,702,508 B2 | 4/2010 | Bennett |
| 7,849,147 B2 | 12/2010 | Rohall et al. |
| 7,865,560 B2 | 1/2011 | Rohall et al. |
| 7,886,012 B2 | 2/2011 | Bedi et al. |
| 8,750,489 B2 | 6/2014 | Park |
| 8,825,478 B2 | 9/2014 | Cox et al. |
| 8,914,452 B2 | 12/2014 | Boston et al. |
| 8,983,840 B2 | 3/2015 | Deshmukh et al. |
| 9,116,984 B2 | 8/2015 | Caldwell et al. |
| 9,118,759 B2 | 8/2015 | Krishnapuram et al. |
| 9,300,790 B2 | 3/2016 | Gainsboro et al. |
| 9,348,817 B2 | 5/2016 | Bohra et al. |
| 9,413,877 B2 | 8/2016 | Aldrich et al. |
| 9,565,301 B2 | 2/2017 | Lee et al. |
| 10,009,464 B2 | 6/2018 | Slovacek |
| 10,051,122 B2 | 8/2018 | Raanani et al. |
| 10,204,158 B2 | 2/2019 | Hay et al. |
| 10,353,904 B2 | 7/2019 | Enders et al. |
| 10,354,677 B2 | 7/2019 | Mohamed et al. |
| 10,628,474 B2 | 4/2020 | Modani et al. |
| 10,637,898 B2 | 4/2020 | Cohen et al. |
| 10,659,585 B1 | 5/2020 | Graham et al. |
| 10,785,185 B2 | 9/2020 | Vennam et al. |
| 10,817,787 B1 | 10/2020 | Zhang |
| 11,018,885 B2 | 5/2021 | Niekrasz |
| 11,070,673 B1 | 7/2021 | Lemus et al. |
| 11,074,284 B2 | 7/2021 | Cunico et al. |
| 11,115,353 B1 | 9/2021 | Crowley et al. |
| 11,228,681 B1 | 1/2022 | Rosenberg |
| 11,232,266 B1 | 1/2022 | Biswas et al. |
| 11,262,978 B1 | 3/2022 | Cohen et al. |
| 11,272,058 B2 | 3/2022 | Khafizov et al. |
| 11,315,569 B1 | 4/2022 | Talieh et al. |
| 11,487,797 B2 | 11/2022 | Shukla et al. |
| 11,500,951 B1 | 11/2022 | Shetty |
| 2009/0259642 A1 | 10/2009 | Cao et al. |
| 2010/0076978 A1 | 3/2010 | Cong et al. |
| 2010/0088299 A1 | 4/2010 | O'Sullivan et al. |
| 2010/0287162 A1 | 11/2010 | Shirwadkar |
| 2012/0209590 A1 | 8/2012 | Huerta et al. |
| 2013/0151533 A1 | 6/2013 | Udupa et al. |
| 2014/0032207 A1 | 1/2014 | Jin et al. |
| 2014/0200928 A1 | 7/2014 | Watanabe et al. |
| 2015/0154956 A1 | 6/2015 | Brown |
| 2015/0193429 A1 | 7/2015 | Bohra et al. |
| 2016/0196492 A1 | 7/2016 | Johnson et al. |
| 2016/0277577 A1 | 9/2016 | Yentis et al. |
| 2016/0350283 A1 | 12/2016 | Carus et al. |
| 2017/0054837 A1 | 2/2017 | Choi et al. |
| 2017/0286867 A1 | 10/2017 | Bell et al. |
| 2018/0351887 A1 | 12/2018 | Efrati et al. |
| 2019/0042645 A1 | 2/2019 | Othmer et al. |
| 2019/0122142 A1 | 4/2019 | Brunn et al. |
| 2019/0297186 A1 | 9/2019 | Karani |
| 2019/0340296 A1 | 11/2019 | Cunico et al. |
| 2019/0373111 A1 | 12/2019 | Rute et al. |
| 2019/0386937 A1 | 12/2019 | Kim |
| 2020/0074312 A1 | 3/2020 | Liang et al. |
| 2020/0137224 A1 | 4/2020 | Rakshit et al. |
| 2020/0184155 A1 | 6/2020 | Galitsky |
| 2020/0193095 A1 | 6/2020 | Fan et al. |
| 2020/0210521 A1 | 7/2020 | Hutchins |
| 2020/0218722 A1 | 7/2020 | Mai et al. |
| 2020/0227026 A1 | 7/2020 | Rajagopal et al. |
| 2020/0311738 A1 | 10/2020 | Gupta et al. |
| 2020/0311739 A1 | 10/2020 | Chopra et al. |
| 2020/0334419 A1 | 10/2020 | Raanani et al. |
| 2020/0401765 A1 | 12/2020 | Ran et al. |
| 2021/0034707 A1 | 2/2021 | Podgorny et al. |
| 2021/0133251 A1 | 5/2021 | Tiwari et al. |
| 2021/0182326 A1 | 6/2021 | Romano et al. |
| 2021/0182491 A1 | 6/2021 | Chen et al. |
| 2021/0193135 A1* | 6/2021 | Gavai ..................... G10L 15/22 |
| 2021/0248324 A1 | 8/2021 | Choudhary |
| 2021/0264897 A1 | 8/2021 | Churav et al. |
| 2021/0272040 A1 | 9/2021 | Johnson et al. |
| 2021/0303784 A1 | 9/2021 | Brdiczka et al. |
| 2021/0304747 A1 | 9/2021 | Haas et al. |
| 2021/0334469 A1 | 10/2021 | Feng et al. |
| 2021/0342554 A1 | 11/2021 | Martin et al. |
| 2021/0357588 A1 | 11/2021 | Friedrich et al. |
| 2021/0375289 A1 | 12/2021 | Zhu et al. |
| 2021/0390127 A1 | 12/2021 | Fox et al. |
| 2022/0004971 A1 | 1/2022 | Kitamura |
| 2022/0030110 A1 | 1/2022 | Khafizov et al. |
| 2022/0067269 A1 | 3/2022 | de Oliveira et al. |
| 2022/0068279 A1 | 3/2022 | Embar et al. |
| 2022/0108086 A1 | 4/2022 | Wu et al. |
| 2022/0109585 A1 | 4/2022 | Asthana et al. |
| 2022/0138432 A1 | 5/2022 | Galitsky |
| 2022/0156464 A1 | 5/2022 | Norton et al. |
| 2022/0189484 A1 | 6/2022 | Malladi et al. |
| 2022/0215052 A1 | 7/2022 | Chalana et al. |
| 2022/0277135 A1 | 9/2022 | Kryscinski et al. |
| 2022/0337443 A1 | 10/2022 | Sood et al. |
| 2022/0391595 A1 | 12/2022 | Shevelev et al. |
| 2022/0392434 A1 | 12/2022 | Asi et al. |
| 2022/0414338 A1 | 12/2022 | Cho et al. |
| 2023/0054726 A1 | 2/2023 | Roy et al. |
| 2023/0057760 A1 | 2/2023 | Galitsky |
| 2023/0122429 A1 | 4/2023 | Gunasekara et al. |
| 2023/0315993 A1* | 10/2023 | Nieborowski .......... G06F 16/35 704/9 |
| 2023/0334072 A1 | 10/2023 | Matsuzawa et al. |
| 2023/0359657 A1 | 11/2023 | Ganhotra et al. |
| 2023/0419042 A1 | 12/2023 | Sabapathy et al. |
| 2023/0419051 A1 | 12/2023 | Sabapathy et al. |
| 2025/0061277 A1* | 2/2025 | Zhu ....................... G06F 40/284 |

OTHER PUBLICATIONS

"Supercharge Your Call Notes—Automated Call Recording and Transcription," Jog.Ai, (6 pages), (online), [Retrieved from the Internet Nov. 15, 2021] <URL: https://jog.ai/>.

"Trustworthy and Cutting Edge AI," The Blue, (12 pages), (online), [Retrieved from the Internet Nov. 12, 2021] <URL: https://theblue.ai/en/>.

Banerjee, Siddhartha et al. "Multi-Document Abstractive Summarization Using ILP Based Multi-Sentence Compression," In Proceedings of the Twenty-Fourth International Joint Conference On Artificial Intelligence (IJCAI 2015), Jan. 2015, pp. 1208-1214.

Baumel, Tal et al. "Query Focused Abstractive Summarization: Incorporating Query Relevance, Multi-Document Coverage, and Summary Length Constraints Into seq2seq Models," arXiv Preprint, arXiv: 1801.07704v2, Jan. 25, 2018, (9 pages).

Baumel, Tal et al. "Topic Concentration in Query-Focused Summarization," Proceedings of the Thirtieth AAAI Conference On Artificial Intelligence (AAAI-16), pp. 2573-2579, Mar. 5, 2016.

Biswas, Pratik K. et al. "Extractive Summarization of Call Transcripts," arXiv Preprint arXiv:2103.10599, Mar. 19, 2021, (10 pages).

Brin, Sergey. "The PageRank Citation Ranking: Bringing Order To The Web," Proceedings of ASIS, vol. 98, Jan. 29, 1998, (17 pages).

Canhasi, Ercan. "Ercan Canhasi: Query Focused Multi Document Summarization Based on the Multi Facility Location Problem," Computer Science On-Line Conference, Artificial Intelligence Trends In Intelligent Systems, CSOC 2017, Advances In Intelligent Systems and Computing, vol. 573, Springer, Cham., Apr. 7, 2017, pp. 210-219, DOI: 10.1007/978-3-319-57261-1_21.

(56) References Cited

OTHER PUBLICATIONS

Carbonell, Jaime et al. "The Use Of MMR, Diversity-Based Reranking For Reordering Documents and Producing Summaries," In Proceedings of the 21st Annual International ACM SIGIR Conference on Research and Development In Information Retrieval, Aug. 1998, pp. 335-336. DOI: 10.1145/290941.291025.

Chandramouli, Aravind et al. "Unsupervised Paradigm For Information Extraction From Transcripts Using BERT," arXiv Preprint arXiv:2110.00949, Oct. 3, 2021, (11 pages).

Chen, Yun-Nung et al. "Intra-Speaker Topic Modeling For Improved Multi-Party Meeting Summarization With Integrated Random Walk," In Proceedings of the 2012 Conference of the North American Chapter of the Association for Computational Linguistics: Human Language Technologies, Jun. 2012, pp. 377-381.

Dang, Hoa Trang. "Overview of DUC 2005," In Proceedings of the Document Understanding Conference, Oct. 9, 2005, vol. 2005, (12 pages). [Available online: https://www-nlpir.nist.gov/projects/duc/pubs/2005papers/OVERVIEW05.pdf].

Devlin, Jacob et al. "BERT: Pre-Training of Deep Bidirectional Transformers for Language Understanding," Proceedings of NAACL-HLT 2019, Jun. 2, 2019, pp. 4171-4186.

Feigenblat, Guy et al. "Unsupervised Query-Focused Multi-Document Summarization Using The Cross Entropy Method," SIGIR '17: Proceedings of the 40th International ACM SIGIR Conference On Research and Development In Information Retrieval, Aug. 7, 2017, pp. 961-964, DOI: 10.1145/3077136.3080690.

Filatova, Elena et al. "Event-Based Extractive Summarization," In Proceedings of ACL Workshop on Summarization, vol. 111, (2004), (8 pages).

Garg, Nikhil et al. "ClusterRank: A Graph Based Method For Meeting Summarization," IDIAP Research Institute, Jun. 2009, (5 pages), Martigny, Switzerland.

Garg, Nikhil et al. "Clusterrank: A Graph Based Method For Meeting Summarization," Proceedings of the 10th International Conference of the International Speech Communication Association (Interspeech 2009), pp. 1499-1502, Sep. 6, 2009, Brighton, United Kingdom.

Gillick, Dan et al. "A Scalable Global Model For Summarization," In Proceedings of the Naacl Hlt Workshop On Integer Linear Programming For Natural Language Processing, Jun. 2009, pp. 10-18.

Goldstein, Jade et al. "Summarization: (1) Using MMR for Diversity- Based Reranking and (2) Evaluating Summaries," Carnegie-Mellon University, Language Technologies Institute, Tipster III Summarization Project, Oct. 1, 1998, pp. 181-195.

Gupta, Surabhi et al. "Measuring Importance and Query Relevance In Topic-Focused Multi-Document Summarization," 45th Annual Meeting of the Association for Computational Linguistics Demo and Poster Sessions, Jun. 2007, pp. 193-196.

Hearst, Marti A. "Text-Tiling: A Quantitative Approach To Discourse Segmentation," Association for Computational Linguistics 1993 (1993), pp. 1-10.

Higashinaka, Ryuichiro et al. "Improving HMM-Based Extractive Summarization For Multi-Domain Contact Center Dialogues," In 2010 IEEE Spoken Language Technology Workshop, Dec. 12, 2010, pp. 61-66. DOI: 10.1109/SLT.2010.5700823.

Kothadiya, Aditya. "Why We Built A Note Taking Software—A Tool That Automatically Takes Notes And Analyzes Sales and Customer Calls," Avoma Blog, (article, online), [Retrieved from the Internet Nov. 15, 2021] <https://www.avoma.com/blog/ai-note-taking-software>.

Li, Chen et al. "Using Supervised Bigram-Based ILP for Extractive Summarization," In Proceedings of the 51st Annual Meeting of the Association For Computational Linguistics, Aug. 4, 2013, pp. 1004-1013, Sofia, Bulgaria.

Liang, Xinnian et al. "Unsupervised Keyphrase Extraction By Jointly Modeling Local and Global Context," arXiv Preprint arXiv:2109.07293v1 [cs.CL], Sep. 15, 2021, (10 pages).

Liu, Yang et al. "Text Summarization With Pretrained Encoders," arXiv Preprint arXiv:1908.08345v2 [cs.CL], Sep. 5, 2019, (11 pages).

McDonald, Ryan. "A Study Of Global Inference Algorithms In Multi-Document Summarization," In European Conference on Information Retrieval, Apr. 2, 2007, (12 pages), Springer, Berlin, Heidelberg. [Available online: https://storage.googleapis.com/pub-tools-public-publication-data/pdf/32687.pdf].

Mehdad, Yashar et al. "Abstractive Meeting Summarization with Entailment and Fusion," In Proceedings of the 14th European Workshop on Natural Language Generation, Aug. 2013, pp. 136-146. [Available online: https://www.aclweb.org/anthology/W13-2117.pdf].

Mihalcea, Rada et al. "Textrank: Bringing Order Into Texts," In Proceedings of the 2004 Conference On Empirical Methods In Natural Language Processing, Jul. 2004, pp. 404-411. [Available online: https://www.aclweb.org/anthology/W04-3252.pdf].

Murray, Gabriel et al. "Generating and Validating Abstracts Of Meeting Conversations: A User Study," In Proceedings of the 6th International Natural Language Generation Conference (2010), (9 pages). [Available online: https://www.aclweb.org/anthology/W10-4211.pdf].

Narayan, Shashi et al. "Stepwise Extractive Summarization and Planning With Structured Transformers," arXiv Preprint arXiv:2010.02744v1 [cs.CL], Oct. 6, 2020, (17 pages).

Nenkova, Ani et al. "The Impact Of Frequency On Summarization," Technical Report MSRTR-2005-101, Microsoft Research, Jan. 2005, (9 pages), Redmond, Washington. [Available online: http://citeseerx.ist.psu.edu/viewdoc/download?doi=10.1.1.529.6099&rep=rep1&type=pdf].

Oya, Tatsuro et al. "A Template-Based Abstractive Meeting Summarization: Leveraging Summary and Source Text Relationships," In Proceedings of the 8th International Natural Language Generation Conference (INLG), Jun. 2014, pp. 45-53. [Available online: https://www.aclweb.org/anthology/W14-4407.pdf].

Padmakumar, Vishakh et al. "Unsupervised Extractive Summarization Using Pointwise Mutual Information," arXiv Preprint arXiv:2102.06272v2 [cs.CL], Mar. 22, 2021, (8 pages).

Radev, Dragomir R. et al. "Ranking Suspected Answers To Natural Language Questions Using Predictive Annotation," ANLC '00: Proceedings of the Sixth Conference On Applied Natural Language Processing, Apr. 29, 2000, pp. 150-157, https://doi.org/10.3115/974147.974168.

Rahman, Nazreena et al. "A Method for Semantic Relatedness Based Query Focused Text Summarization," In International Conference on Pattern Recognition and Machine Intelligence (PReMI 2017), LNCS 10597, Springer, Cham., pp. 387-393, Dec. 5, 2017, doi: 10.1007/978-3-319-69900-4_49.

Rudra, Koustav et al. "Summarizing Situational Tweets in Crisis Scenarios: An Extractive-Abstractive Approach," IEEE Transactions On Computational Social Systems, Sep. 16, 2019, vol. 6, No. 5, pp. 981-993.

Rudra, Koustav. "Extracting and Summarizing Information From Microblogs During Disasters," Ph.D. Thesis, Apr. 2018, (199 pages).

Shang, Guokan et al. "Unsupervised Abstractive Meeting Summarization with Multi-Sentence Compression and Budgeted Submodular Maximization," In Proceedings of the 56th Annual Meeting Of The Association For Computational Linguistics (Long Papers), Jul. 15, 2018, pp. 664-674, Melbourne, Australia. [Available online: https://www.aclweb.org/anthology/P18-1062.pdf].

Singer, Eleanor et al. "Some Methodological Uses of Responses To Open Questions and Other Verbatim Comments In Quantitative Surveys," Methods, Data, Analyses: A Journal For Quantitative Methods and Survey Methodology (mda), vol. 11, No. 2, (2017), pp. 115-134, DOI: 10.12758/mda.2017.01.

Steinberger, Josef et al. "Evaluation Measures for Text Summarization," Computing and Informatics, vol. 28, Mar. 2, 2009, pp. 1001-1026.

Stepanov, E. et al. "Automatic Summarization of Call-Center Conversations," In Conference: IEEE Automatic Speech Recognition and Understanding Workshop (ASRU 2015), (2 pages), Dec. 2015, available online: http://sisl.disi.unitn.it/wp-content/uploads/2015/11/ASRU15-SpeechSummarizationDemo.pdf.

(56) References Cited

OTHER PUBLICATIONS

Sun, Xu et al. "Feature-Frequency-Adaptive On-Line Training For Fast and Accurate Natural Language Processing," Computational Linguistic, vol. 40, No. 3, Sep. 1, 2014, pp. 563-586.

Trione, Jeremy et al. "Beyond Utterance Extraction: Summary Recombination for Speech Summarization," In Interspeech, pp. 680-684, Sep. 2016, available online: https://pageperso.lis-lab.fr/benoit.favre/papers/favre_is2016a.pdf.

Ushio, Asahi et al. "Back To The Basics: A Quantitative Analysis of Statistical and Graph-Based Term Weighting Schemes For Keyword Extraction," arXiv Preprint arXiv:210408028v2 [cs.LG], Sep. 13, 2021, (15 pages), United Kingdom.

Vanetik, Natalia et al. "Query-Based Summarization Using MDL Principle," Proceedings of the MultiLing 2017 Workshop On Summarization and Summary Evaluation Across Source Types and Genres, Association for Computational Linguistics, pp. 22-31, Apr. 3, 2017, Valencia, Spain.

Vreeken, Jilles et al. "KRIMP: Mining Itemsets That Compress," Data Mining and Knowledge Discovery, Jul. 2011, vol. 23, No. 1, pp. 169-214, DOI: 10.1007/s10618-010-0202-x.

Xu, Shusheng et al. "Unsupervised Extractive Summarization by Pre-Training Hierarchical Transformers," arXiv Preprint arXiv:2010.08242v1 [cs.CL], Oct. 16, 2020, (15 pages), Shanghai, China.

Yang, Zichao et al. "Hierarchical Attention Networks for Document Classification," Proceedings of the NAACL-HLT 2016, Association for Computational Linguistics, Jun. 12, 2016, pp. 1480-1489, San Diego, California.

Final Rejection Mailed on Apr. 15, 2024 for U.S. Appl. No. 17/405,555, 25 page(s).

Non-Final Rejection Mailed on Aug. 14, 2024 for U.S. Appl. No. 17/405,555, 29 page(s).

Non-Final Rejection Mailed on Oct. 17, 2024 for U.S. Appl. No. 17/937,606, 33 page(s).

Notice of Allowance and Fees Due (PTOL-85) Mailed on Sep. 11, 2024 for U.S. Appl. No. 17/937,616, 14 page(s).

Ma, Bing et al. "Extractive Dialogue Summarization Without Annotation Based On Distantly Supervised Machine Reading Comprehension In Customer Service," In IEEE/ACM Transactions on Audio, Speech, and Language Processing, vol. 30, pp. 87-97 Jan. 1, 2022, (Year: 2022).

Notice of Allowance and Fee(s) Due, for U.S. Appl. No. 17/815,817, dated Mar. 30, 2023, (12 pages), United States Patent and Trademark Office, US.

Yih, Wen-tau et al. "Multi-Document Summarization By Maximizing Informative Content-Words," In IJCAI, Jan. 6, 2007, vol. 7, pp. 1776-1782. [Available online: https://www.aaai.org/Papers/IJCAI/2007/IJCAI07-287.pdf].

Yuliska et al. "A Comparative Study of Deep Learning Approaches for Query-Focused Extractive Multi-Document Summarization," 2019 IEEE 2nd International Conference on Information and Computer Technologies (ICICT), May 13, 2019, pp. 153-157, doi: 10.1109/INFOCT.2019.8710851.

Zhang, Xingxing et al. "HIBERT: Document Level Pre-training of Hierarchical Bidirectional Transformers for Document Summarization," arXiv Preprint arXiv: 1905.06566v1 [cs.CL] May 16, 2019, (11 pages), available online at https://arxiv.org/pdf/1905.06566.pdf.

Zhong, Junmei et al. "Predicting Customer Call Intent By Analyzing Phone Call Transcripts Based On CNN For Multi-Class Classification," Computer Science & Information Technology (CS & IT), pp. 9-20, arXiv preprint arXiv: 1907.03715, Jul. 8, 2019, (12 pages), available online: https://arxiv.org/ftp/arxiv/papers/1907/1907.03715.pdf.

Zhou, Peng et al. "Attention-Based Bidirectional Long Short-Term Memory Networks for Relation Classification," Proceedings of the 54th Annual Meeting of the Association for Computational Linguistics, pp. 207-212, Aug. 7, 2016, Berlin, Germany.

Zweig, Geoffrey et al. "Automated Quality Monitoring For Call Centers Using Speech and NLP Technologies," Proceedings of the Human Language Technology Conference of the NAACL, Companion vol. pp. 292-295, Jun. 2006.

NonFinal Office Action for U.S. Appl. No. 17/122,607, dated Nov. 8, 2022, (58 pages), United States Patent and Trademark Office, US.

Vanetik, Natalia et al. "An Unsupervised Constrained Optimization Approach To Compressive Summarization," Information Sciences, vol. 509, Jan. 2020, pp. 22-35.

NonFinal Office Action for U.S. Appl. No. 17/405,555, dated Nov. 17, 2023, (23 pages), United States Patent and Trademark Office, US.

Advisory Action (PTOL-303) Mailed on Jun. 27, 2024 for U.S. Appl. No. 17/405,555, 2 page(s).

Notice of Allowance and Fee(s) Due for U.S. Appl. No. 17/122,607, dated Mar. 28, 2023, (8 pages), United States Patent and Trademark Office, US.

Advisory Action (PTOL-303) Mailed on Mar. 19, 2025 for U.S. Appl. No. 17/405,555, 2 page(s).

Final Rejection Mailed on Feb. 20, 2025 for U.S. Appl. No. 17/937,606, 38 page(s).

Final Rejection Mailed on Jan. 21, 2025 for U.S. Appl. No. 17/405,555, 30 page(s).

Notice of Allowance and Fees Due (PTOL-85) Mailed on Apr. 28, 2025 for U.S. Appl. No. 17/405,555, 16 page(s).

\* cited by examiner

| Sr. No. | Call Reason | Additional Context |
|---|---|---|
| 1 | Appeal/Grievance - Expedited | Appeal - Expedited Request Denied |
| 2 | Appeal/Grievance - Expedited | Appeal - Expedited Request Granted |
| 3 | Appeal/Grievance - Received Inquiry | Appeal - Denied / Upheld |
| 4 | Appeal/Grievance - Received Inquiry | Appeal - Granted / Approved |
| 5 | Appeal/Grievance - Requested By Member | Appeal - Filed by Agent |
| 6 | Appeal/Grievance - Requested By Member | Appeal - Member Will Submit |
| 7 | Appeal/Grievance - Status | Appeal - Not received |
| 8 | Appeal/Grievance - Status | Appeal - On File |
| 9 | Appeal/Grievance - Status | Appeal - Denied / Upheld |
| 10 | Appeal/Grievance - Status | Appeal - Granted / Approved |
| 11 | Benefits - Balance Inquiry | Benefits – Deductible |
| 12 | Benefits - Balance Inquiry | Benefits – HSA/FSA |
| 13 | Benefits - Balance Inquiry | Benefits - OOP Maximum |
| 14 | Benefits - Balance Inquiry | Benefits – OTC Balance |
| ... | ... | ... |

FIG. 7

NATURAL LANGUAGE PROCESSING TECHNIQUES FOR MACHINE-LEARNING-GUIDED SUMMARIZATION USING HYBRID CLASS TEMPLATES

CROSS-REFERENCES TO RELATED APPLICATION(S)

The present application claims priority to U.S. Provisional Patent Application No. 63/365,340, filed on May 26, 2022, which is incorporated herein in entirety.

BACKGROUND

Various embodiments of the present invention address technical challenges related to performing natural language processing and provide solutions to address the efficiency and reliability shortcomings of existing natural language processing solutions.

BRIEF SUMMARY

In general, various embodiments of the present invention provide methods, apparatus, systems, computing devices, computing entities, and/or the like for performing natural language processing operations for generating guided summaries using summarization templates that are mapped to hybrid classes of a hybrid classification space for a hybrid classification machine learning model. In some embodiments, by using summarization templates, a proposed summarization framework is able to vastly reduce the computational complexity of performing summarization on an input document data object, such as an input multi-party communication transcript data object, by defining the set of dynamic data fields that apply to the input document data object based at least in part on an assigned class/category of the input document data object.

In accordance with one aspect, a method is provided. In one embodiment, the method comprises: generating, based at least in part on a multi-party communication transcript data object and using a hybrid space classification machine learning model, a hybrid class for the multi-party communication transcript data object that comprises a primary class for the multi-party communication transcript data object and a secondary class for the multi-party communication transcript data object, wherein: (i) the primary class is selected from a primary classification space, and (ii) the secondary class is selected from a secondary classification space that is distinct from the primary classification space; generating, based at least in part on the hybrid class, a summarization template for the multi-party communication transcript data object, wherein the summarization defines: (i) a plurality of template static text segments associated with the hybrid class, and (ii) a plurality of template dynamic data fields; for each template dynamic data field, generating, based at least in part on monitored user activity data for a monitored end user associated with the multi-party communication transcript data object during a communication time period, a predicted data field value; generating, based at least in part on the summarization template and each predicted data field value, a guided summary; and performing one or more prediction-based actions based at least in part on the guided summary.

In accordance with another aspect, an apparatus comprising at least one processor and at least one memory including computer program code is provided. In one embodiment, the at least one memory and the computer program code may be configured to, with the processor, cause the apparatus to: generate, based at least in part on a multi-party communication transcript data object and using a hybrid space classification machine learning model, a hybrid class for the multi-party communication transcript data object that comprises a primary class for the multi-party communication transcript data object and a secondary class for the multi-party communication transcript data object, wherein: (i) the primary class is selected from a primary classification space, and (ii) the secondary class is selected from a secondary classification space that is distinct from the primary classification space; generate, based at least in part on the hybrid class, a summarization template for the multi-party communication transcript data object, wherein the summarization defines: (i) a plurality of template static text segments associated with the hybrid class, and (ii) a plurality of template dynamic data fields; for each template dynamic data field, generate, based at least in part on monitored user activity data for a monitored end user associated with the multi-party communication transcript data object during a communication time period, a predicted data field value; generate, based at least in part on the summarization template and each predicted data field value, a guided summary; and perform one or more prediction-based actions based at least in part on the guided summary.

In accordance with yet another aspect, a computer program product is provided. The computer program product may comprise at least one computer-readable storage medium having computer-readable program code portions stored therein, the computer-readable program code portions comprising executable portions configured to: generate, based at least in part on a multi-party communication transcript data object and using a hybrid space classification machine learning model, a hybrid class for the multi-party communication transcript data object that comprises a primary class for the multi-party communication transcript data object and a secondary class for the multi-party communication transcript data object, wherein: (i) the primary class is selected from a primary classification space, and (ii) the secondary class is selected from a secondary classification space that is distinct from the primary classification space; generate, based at least in part on the hybrid class, a summarization template for the multi-party communication transcript data object, wherein the summarization defines: (i) a plurality of template static text segments associated with the hybrid class, and (ii) a plurality of template dynamic data fields; for each template dynamic data field, generate, based at least in part on monitored user activity data for a monitored end user associated with the multi-party communication transcript data object during a communication time period, a predicted data field value; generate, based at least in part on the summarization template and each predicted data field value, a guided summary; and perform one or more prediction-based actions based at least in part on the guided summary.

BRIEF DESCRIPTION OF THE DRAWINGS

Figure 1:
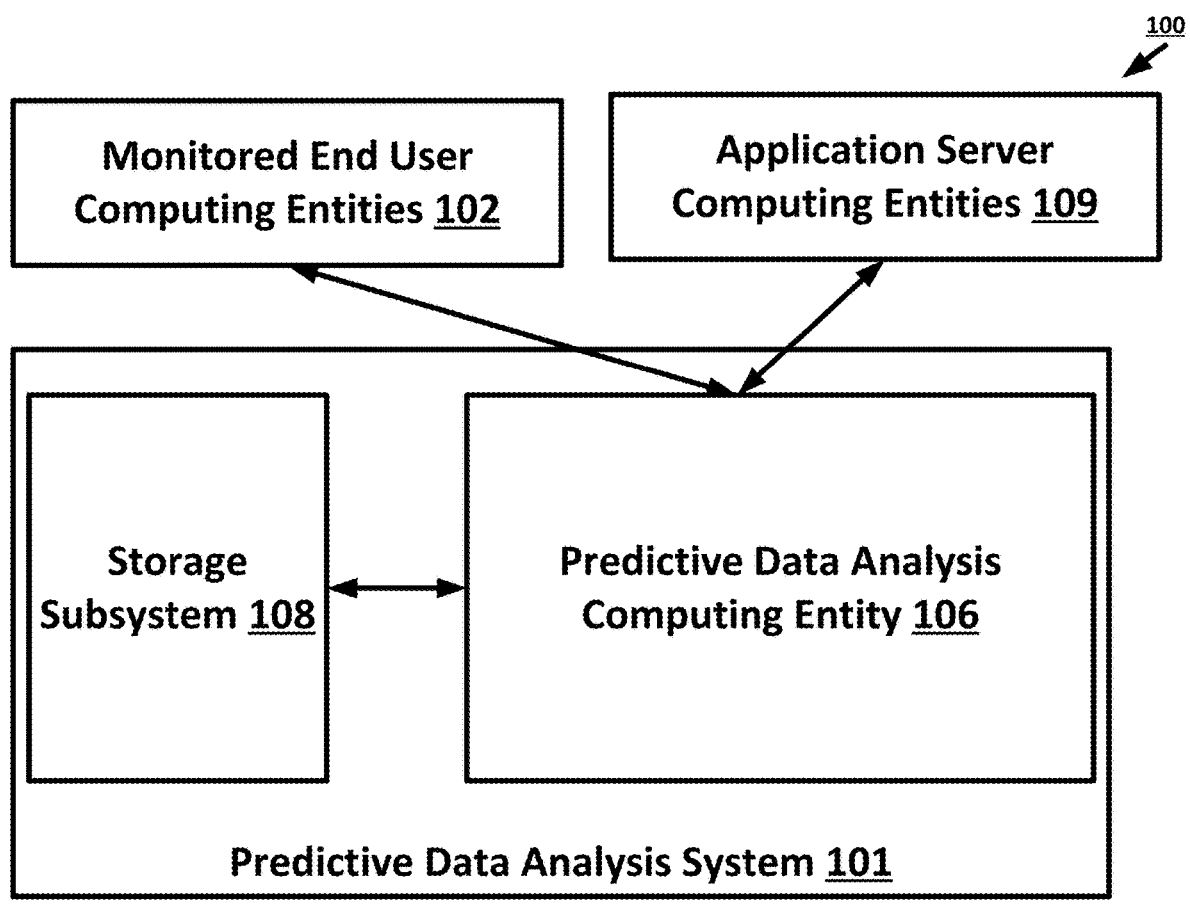

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
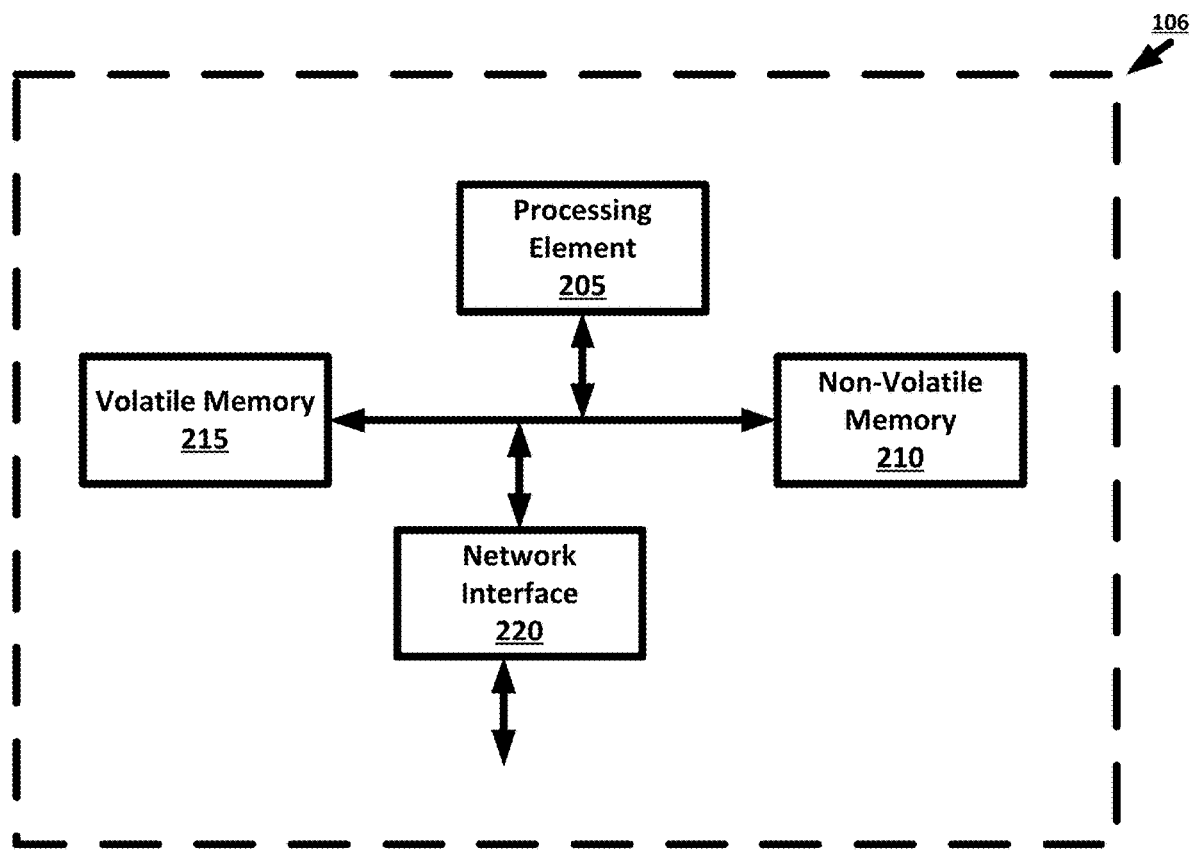

FIG. 2 provides an example predictive data analysis computing entity in accordance with some embodiments discussed herein.

Figure 3:
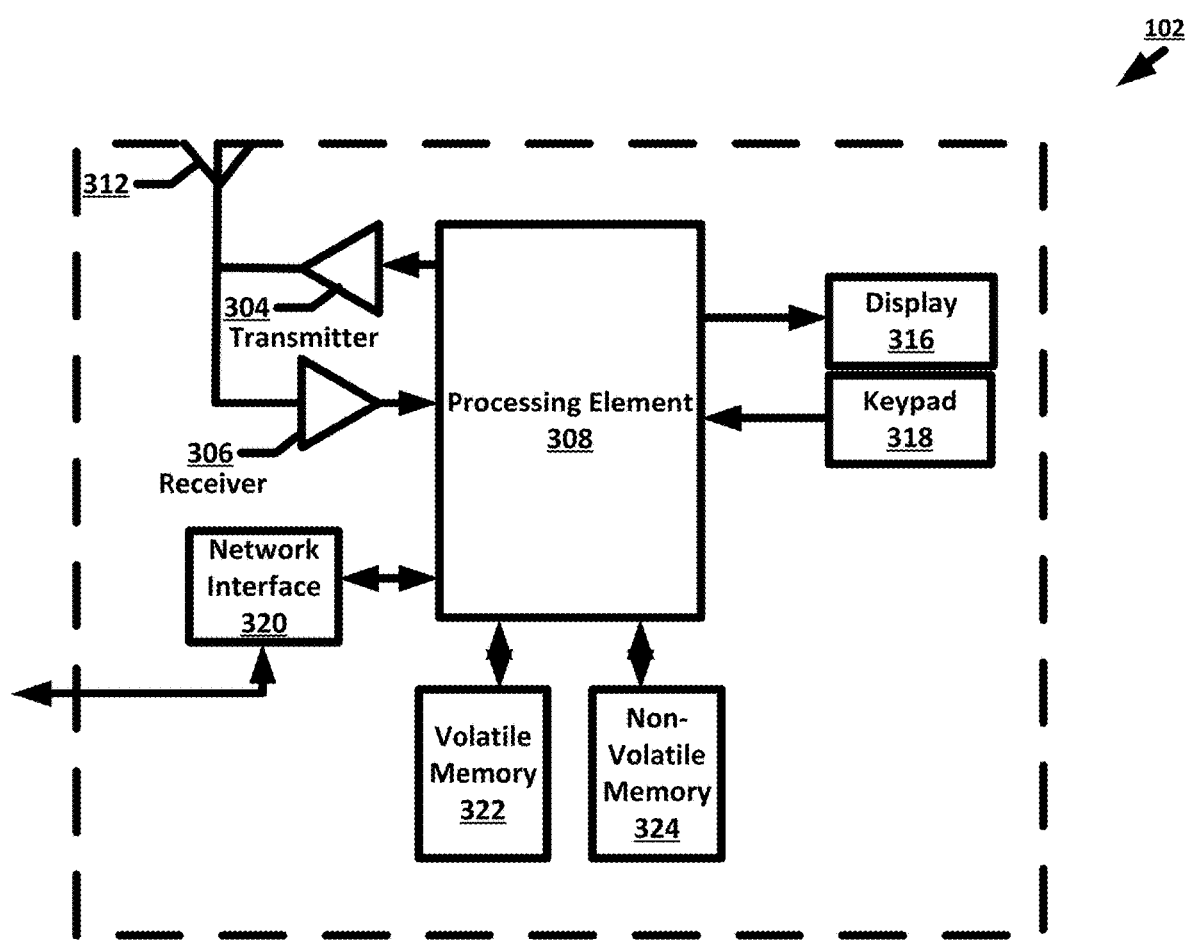

FIG. 3 provides an example monitored end user computing entity in accordance with some embodiments discussed herein.

Figure 4:
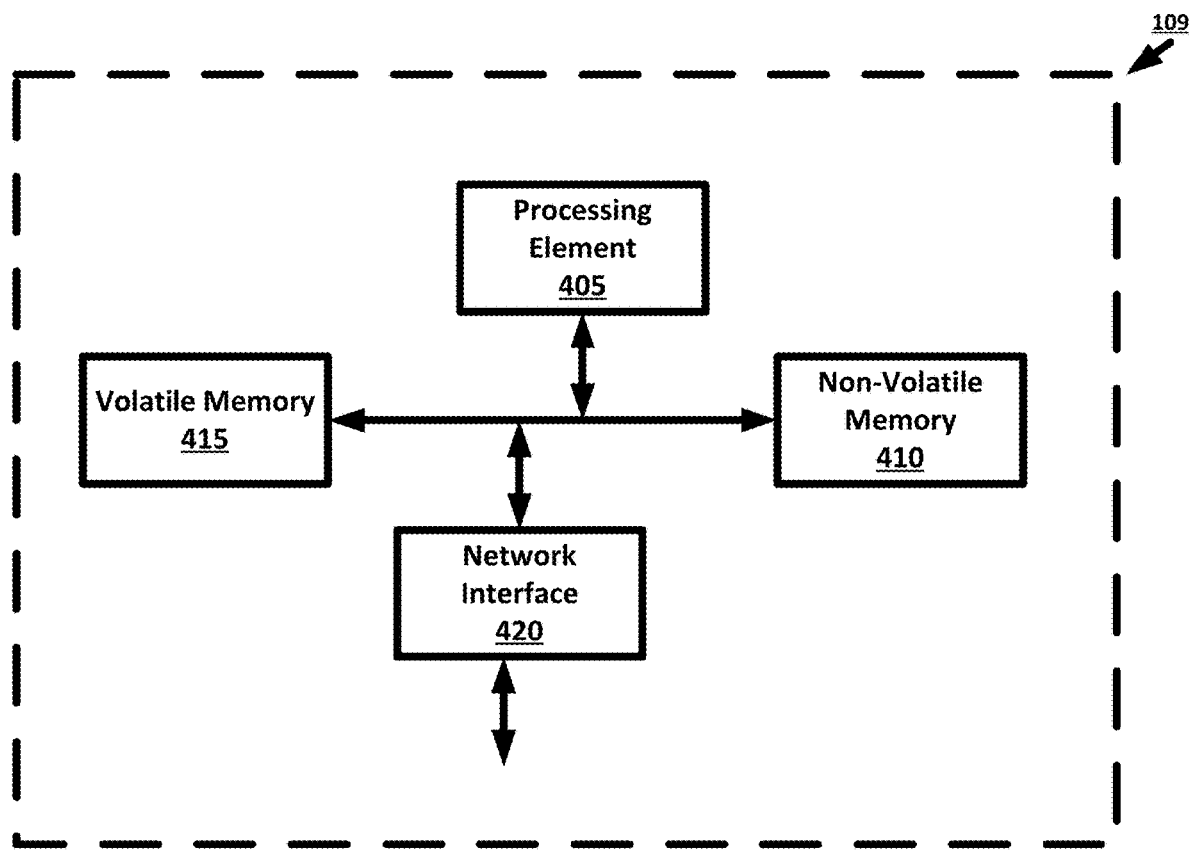

FIG. 4 provides an example application server computing entity in accordance with some embodiments discussed herein.

Figure 5:
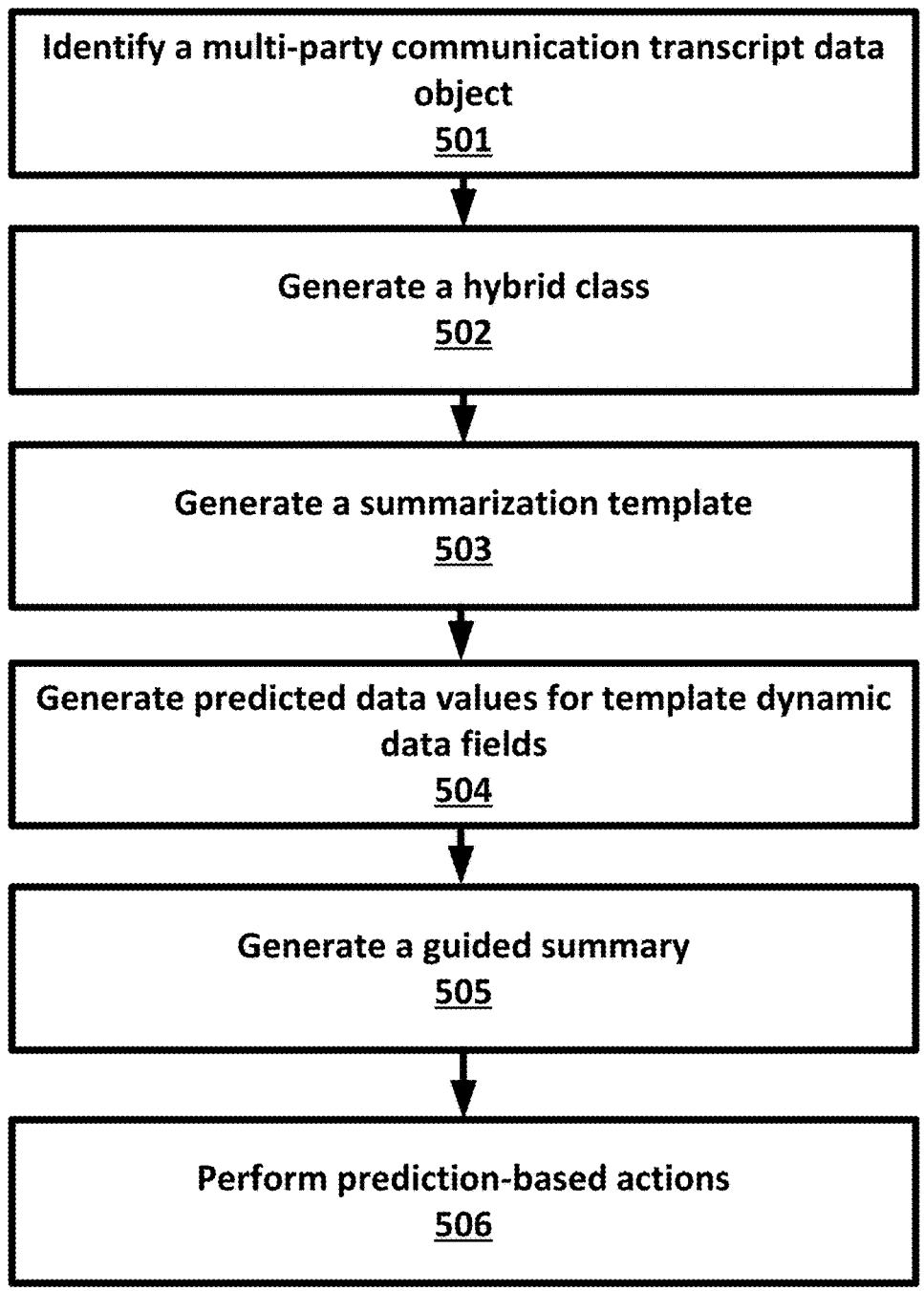

FIG. 5 is a flowchart diagram of an example process for generating a guided summary for a multi-party communication transcript data object in accordance with some embodiments discussed herein.

Figure 6A:
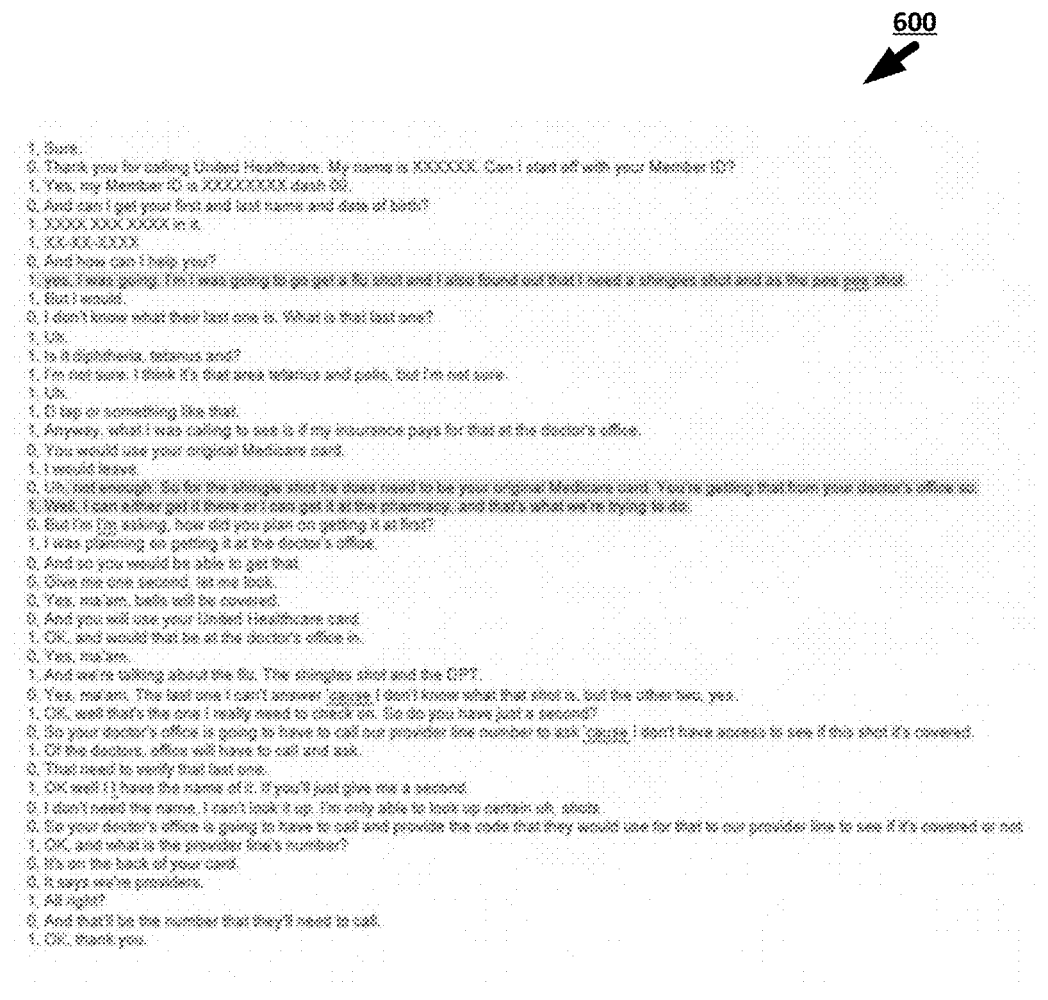
Figure 6B:
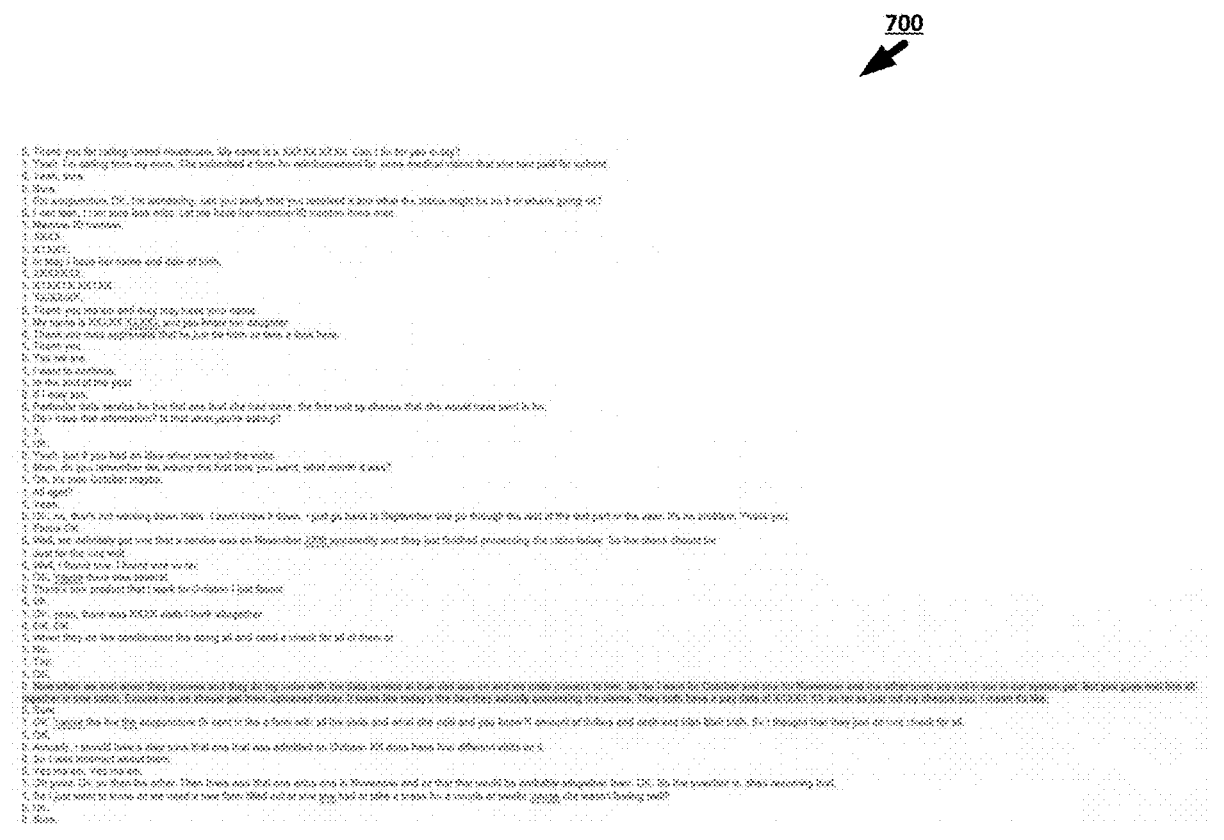

FIGS. 6A-6B provide operational examples of two multi-party communication transcript data objects in accordance with some embodiments discussed herein.

FIG. 7 provides an operational examples of hybrid classification spaces in accordance with some embodiments discussed herein.

Figure 8:
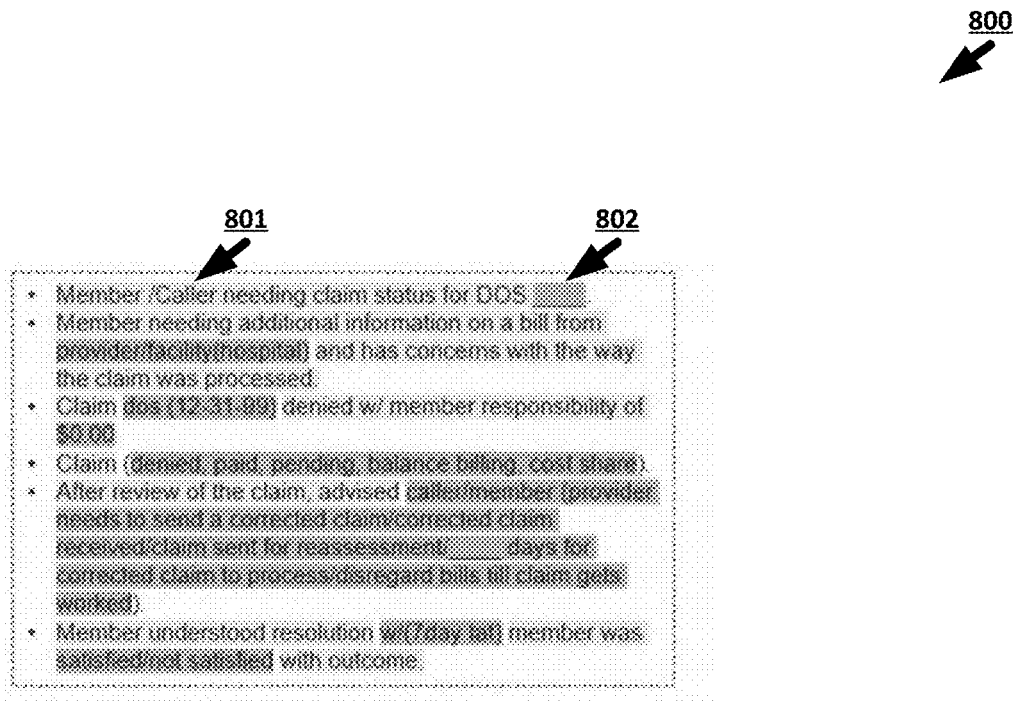

FIG. 8 provides an operational example of a summarization template in accordance with some embodiments discussed herein.

Figure 9:
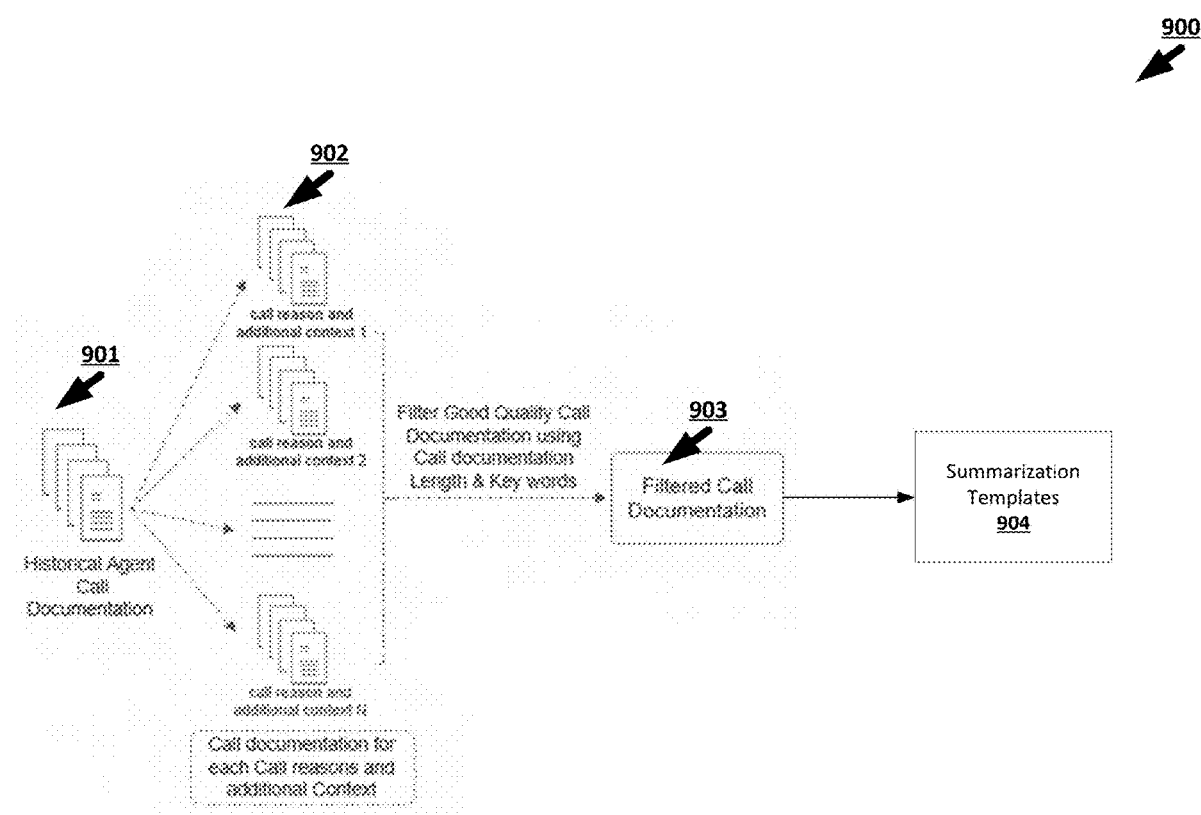

FIG. 9 is a data flow diagram of an example process for generating summarization templates in accordance with some embodiments discussed herein.

Figure 10:
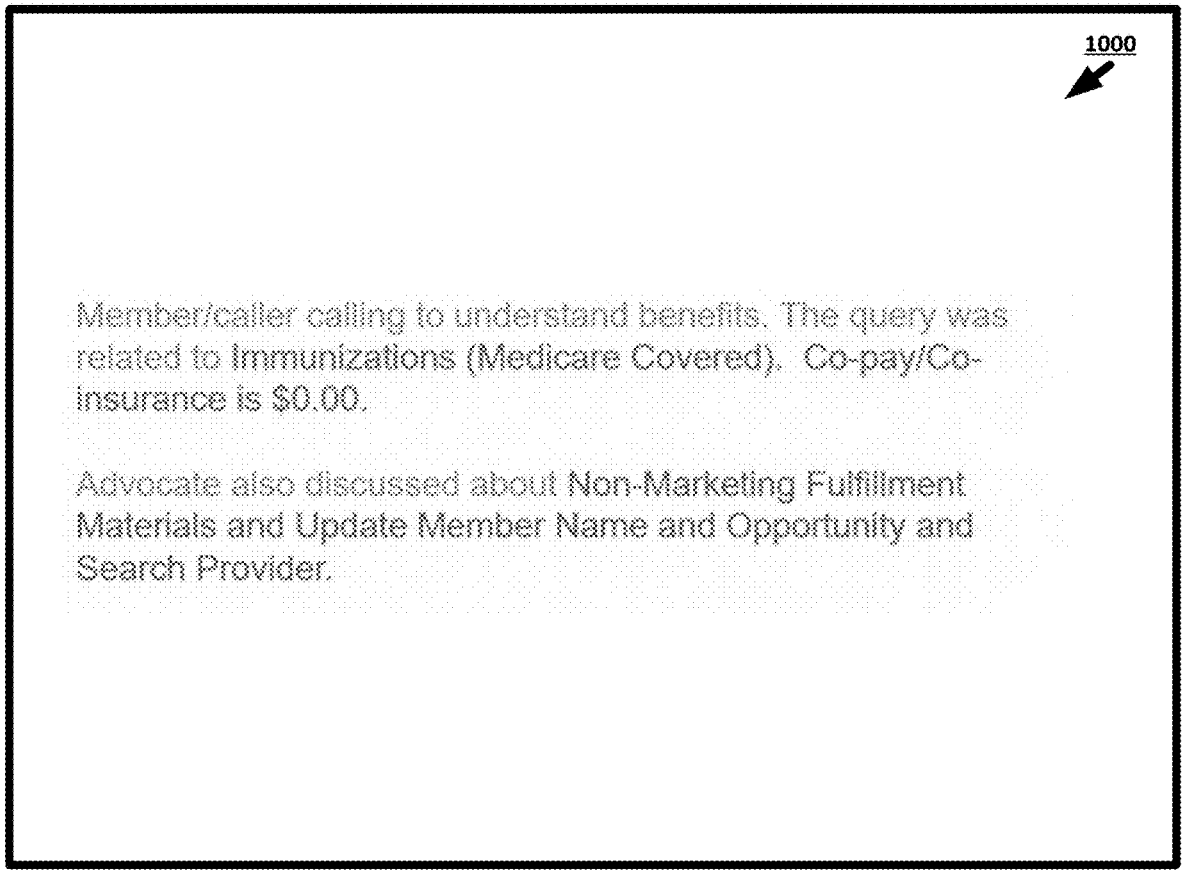

FIG. 10 provides an operational example of a prediction output user interface in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Improvements

Various embodiments of the present invention disclose techniques for improving storage efficiency of multi-party communication transcript data object storage systems. As described herein, various embodiments of the present invention disclose techniques for generating summarizations of multi-party communication transcript data object using summarization templates that are mapped to hybrid classes of a hybrid classification space for a hybrid classification machine learning model. Because a summarization of a multi-party communication transcript data object is smaller in size than the underlying multi-party communication transcript data object (as the summarization includes subsets of words/sentences of the underlying multi-party communication transcript data object), various embodiments of the present invention enable storing summarizations of multi-party communication transcript data object instead of the document data objects that are bigger in size. In this way, various embodiments of the present invention reduce storage requirements associated with storing multi-party communication transcript data object data, and thus increase storage efficiency of storing multi-party communication transcript data object data associated with multi-party communication transcript data objects. Accordingly, by generating summarizations of multi-party communication transcript data objects that comprise a selected subset of each multi-party communication transcript data object, various embodiments of the present invention disclose techniques for improving storage efficiency of various multi-party communication transcript data object storage systems.

Furthermore, various embodiments of the present invention make important technical contributions to improving predictive accuracy of natural language processing machine learning models that are configured to perform natural language processing operations on multi-party communication transcript data objects by using summarization templates that are mapped to hybrid classes of a hybrid classification space for a hybrid classification machine learning model. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., Feature-Frequency-Adaptive On-line Training for Fast and Accurate Natural Language Processing in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improving efficiency and speed of training natural language processing machine learning models, thus reducing the number of computational operations needed and/or the amount of training data entries needed to train natural language processing machine learning models. Accordingly, the techniques described herein improve at least one of the computational efficiency, storage-wise efficiency, and speed of training natural language processing machine learning models.

Moreover, various embodiments of the present invention make important technical contributions to improving resource-usage efficiency of post-prediction systems by using summarizations to set the number of allowed computing entities used by the noted post-prediction systems. For example, in some embodiments, a predictive data analysis computing entity determines D transcript classifications for D multi-party communication transcript data objects based at least in part on the D summarizations for the D multi-party communication transcript data objects. Then, the count of multi-party communication transcript data objects that are associated with an affirmative transcript classification, along with a resource utilization ratio for each multi-party communication transcript data object, can be used to predict a predicted number of computing entities needed to perform post-prediction processing operations (e.g., automated investigation operations) with respect to the D multi-party communication transcript data objects. For example, in some embodiments, the number of computing entities needed to perform post-prediction processing operations (e.g., automated investigation operations) with respect to D multi-party communication transcript data objects can be determined based at least in part on the output of the equation: $R=\text{ceil}(\Sigma_k^{k=K} ur_k)$, where R is the predicted number of computing entities needed to perform post-prediction processing operations with respect to the D multi-party communication transcript data objects, ceil(•) is a ceiling function that returns the closest integer that is greater than or equal to the value provided as the input parameter of the ceiling function, k is an index variable that iterates over multi-party communication transcript data objects among the D multi-party communication transcript data objects that are associated with affirmative transcript classifications, and $ur_k$ is the estimated resource utilization ratio for a kth multi-party communication transcript data object that may be determined based at least in part on a count of utterances/tokens/words in the kth multi-party communication transcript data object. In some embodiments, once R is generated, the predictive data analysis computing entity can use R to perform operational load balancing for a server system that is configured to perform post-prediction processing operations (e.g., automated investigation operations) with respect to the D multi-party communication transcript data objects. This may be done by allocating computing entities to the post-prediction processing operations if the number of currently allocated computing entities is below R, and deallocating currently allocated computing entities if the number of currently allocated computing entities is above R.

In addition, various embodiments of the present invention improve the computational efficiency of performing summarizations by using summarization templates. In some embodiments, by using summarization templates, a proposed summarization framework is able to vastly reduce the computational complexity of performing summarization on an input document data object, such as an input multi-party communication transcript data object, by defining the set of dynamic data fields that apply to the input document data object based at least in part on an assigned class/category of the input document data object. For example, consider an exemplary embodiment in which a summarization framework is used to process document data objects associated with G defined classes/categories to generate summarizations for the noted document data objects. In this exemplary embodiment, if the related dynamic data fields for the G defined classes/categories include F dynamic data fields, and if extracting each dynamic data field for a particular document data object has a computational complexity of O(E), then extracting the dynamic data fields for the particular document data object has a computational complexity of O(EF). In contrast, using various embodiments of the present invention, a proposed summarization framework first assigns a gth class/category to the particular document data object, and then identifies an $F_g$-sized subset of the F dynamic data fields that include only those dynamic data field that are associated with the gth class/category. In this way, the proposed summarization framework extracts the required dynamic data fields for the particular data object with a computational complexity of $O(EF_g)$. Because $F_g<F$, and typically $F_g<<F$, then $O(EF_g) O(EF)$. Accordingly, by defining the set of dynamic data fields that apply to an input document data object based at least in part on an assigned class/category of the input document data object, various embodiments of the present invention reduce the computational complexity of performing summarization on the input document data object and improve operational/computational efficiency of performing summarization on the input document data object.

Various embodiments of the present invention relate to generating call documentation for a call between a member and an agent based at least in part on a combination of the reason for the call and additional context that are determined utilizing a machine learning call classification model. The call reason and additional context are used to identify a corresponding call documentation template that includes call-specific blank fields that are populated by mapping each call-specific blank field to corresponding data captured during the call.

In some embodiments, for a given call between a member and an agent, a real-time transcript of the call is generated. The real-time transcript is then provided as input to a trained machine learning call classification model configured to identify the call reason and additional context for the call at a high level of granularity. In embodiments, the machine learning call classification model is configured to output for a given call one call reason and one additional call context for a given call transcript.

In some embodiments, based at least in part on the call reason and additional context for a call, a call documentation template is identified for the call from a plurality of call documentation templates that each correspond to a unique call reason and additional context combination. In embodiments, the steps of creating the plurality of call documentation templates comprise: extracting historical call documentations for each combination of call reason and additional context, filtering the historical call documentations, based at least in part on standard operating procedure (SOP), to identify call documentations that are deemed "Good Quality," manually analyzing the "Good Quality" call documentations to identify: (i) standard sentences/phrases that are common across the call documentations and (ii) call-specific sentences/phrases that are omitted from call documentation templates when generated, and creating a call documentation template for each unique combination of call reason and additional context based at least in part on the identified standard common sentences/phrases and call-specific phrases, where a given call documentation template comprises identified standard common phrases and blank call-specific fields.

In some embodiments, having identified the corresponding call documentation template for a given call, the blank call-specific fields of the call documentation template are populated utilizing information captured during the call. In some embodiments, call information is captured utilizing Maestro, which captures information relating to a member's interaction with a software platform, including the member's details, the member's historical touchpoints with the software platform, the resolution provided by agents on member calls, and actions taken by agents on member calls. The blank call-specific fields are mapped to the corresponding data to fill the blank fields.

Various embodiments of the present invention relate to a machine learning-based system for generating call documentation that is configured to: (i) determine a call reason and additional context for the call by utilizing a machine learning call classification model; (ii) identify, based at least in part on the call reason and additional context combination, a call documentation template comprising standard phrases and blank call-specific fields of a plurality of call documentation templates each corresponding to a reason-context combination determined using the machine learning call classification model; and (iii) populate the blank call-specific fields by mapping each blank call-specific field to corresponding data captured during the call.

II. Definitions

The term "hybrid class" may refer to a data construct that describes be a class/category for the multi-party communication transcript data object that is generated based at least in part on two or more underlying predicted classes for the multi-party communication transcript data object, such as a primary class that describes a top-level reason code for the multi-party communication transcript data object and a secondary class that describes a bottom-level additional context code for the multi-party communication transcript data object. However, while various embodiments of the present invention describe generating guided summarizations based at least in part on hybrid classes, a person of ordinary skill in the relevant technology will recognize that, in some embodiments, a guided summarization for a document data object may be generated based at least in part on a non-hybrid class for the document data object that is generated based at least in part on only one underlying predicted class for the document data object. In some embodiments, a hybrid class describes an assigned class/category for a multi-party communication transcript data object that is determined based at least in part on C underlying predicted class for the multi-party communication transcript data object, wherein C may be a value that is defined by configuration hyperparameters of a hybrid space classification machine learning model that is used to generate hybrid classes for input multi-party communication transcript data object. For example, when C=2, then the hybrid class for a multi-party communication transcript data object may be determined (e.g., may be a pair comprising) a primary class for the multi-party communication transcript data object (e.g., a primary class that describes a top-level call reason code for the multi-party communication transcript data object) and a secondary class for the multi-party communication transcript data object (e.g., a secondary class that describes a bottom-level additional context code for the multi-party communication transcript data object).

The term "hybrid classification space" may refer to a data construct that describes a set of all hybrid classes that may be assigned to multi-party communication transcript data object. In some embodiments, the number of hybrid classes defined by a hybrid classification space describes how many cross-level hierarchical dependencies exist between the C classification levels associated with the hybrid classification space. In some embodiments, given a set of C independent and non-hierarchical classification levels associated with a hybrid classification space, where each cth classification level is associated with a cth-level classification schema that defines $N_c$ cth-level classes that may be assigned to multi-party communication transcript data objects as selected/assigned cth-level classes, then the hybrid classification space defines/comprises $\Pi_{i=1}^{C} N_c$. For example, given C=2, where the first-level classification schema comprises two top-level reason codes R1 and R2 and the second-level classification schema comprises four bottom-level additional context codes A1, A2, A3, and A4, then the hybrid class comprises the following 2*4=8 hybrid classes: a hybrid class corresponding to the ordered pair (R1, A1), a hybrid class corresponding to the ordered pair (R1, A2), a hybrid class corresponding to the ordered pair (R1, A3), a hybrid class corresponding to the ordered pair (R1, A4), a hybrid class corresponding to the ordered pair (R2, A1), a hybrid class corresponding to the ordered pair (R2, A2), a hybrid class corresponding to the ordered pair (R2, A3), and a hybrid class corresponding to the ordered pair (R2, A4). However, if there are hierarchical dependency relationships between the C classification levels associated with a hybrid classification space, such that for example the assigned/selected cth-level class for a multi-party communication transcript data object can be used to generate/filter/select an applicable (c+1)th-level classification space for the multi-party communication transcript data object that comprises less than all of the defined candidate (c+1)th-level classes in the (c+1)th-level classification schema, then the hybrid classification space defines/comprises less than $\Pi_{i=1}^{C} N_c$ defined hybrid classes, where each $N_c$ value is the count of cth-level underlying classes defined by the cth-level classification schema for a cth classification level associated with the hybrid classification space. For example, given C=2, where the first-level classification schema comprises two top-level reason codes R1 and R2 and the second-level classification schema comprises four bottom-level additional context codes A1, A2, A3, and A4, if A1 and A2 can only be assigned to a multi-party communication transcript data object if R1 is already assigned to the multi-party communication transcript data object, and further if A3 and A4 can only be assigned to a multi-party communication transcript data object if R1 is already assigned to the multi-party communication transcript data object, then the hybrid classification space comprises the following four hybrid class: a hybrid class corresponding to the ordered pair (R1, A1), a hybrid class corresponding to the ordered pair (R1, A2), a hybrid class corresponding to the ordered pair (R2, A3), and a hybrid class corresponding to the ordered pair (R2, A4).

The term "hybrid classification space machine learning model" may refer to a data construct that describes a machine learning model that is configured to generate, for an input multi-party communication transcript data object, a hybrid class that is selected from a hybrid classification space for the hybrid classification machine learning model. In some embodiments, the hybrid classification space machine learning model comprises an encoding layer (e.g., an attention-based encoding layer) and a classification layer, where the encoding layer is configured to process the input multi-party communication transcript data object to generate a fixed-size embedded representation of the multi-party communication transcript data object, while the classification layer is configured to process the fixed-size embedded representation of the multi-party communication transcript data object to map the multi-party communication transcript data object to a mapped hybrid class defined by the hybrid classification space. An example of a hybrid classification space machine learning model is the A1 Call Center Agent (ACC) machine learning model. In some embodiments, the hybrid classification space for a hybrid classification space machine learning model is provided as configuration hyperparameter data for the noted hybrid classification space machine learning model. In some embodiments, inputs to a hybrid classification space machine learning model comprise, for a given input multi-party communication transcript data object, a file containing text data associated with the given input multi-party communication transcript data object, and/or a vector containing an initial representation (e.g., a one-hot-coded representation, a bag-of-words representation, a Paragraph2Vec representation, and/or the like) of the given input multi-party communication transcript data object. In some embodiments, outputs of a hybrid classification space machine learning model comprise, for a given input multi-party communication transcript data object, C vectors, where each cth vector is associated with a respective cth classification level, has the size $N_c$ which describes the number of cth-level classes defined by the cth-level classification schema for the respective cth classification level, and describes, for each cth-level class defined by the cth-level classification schema, a predicted likelihood that the given input multi-party communication transcript data object should be assigned the particular cth level class. In some embodiments, the hybrid classification space machine learning model is trained using ground-truth hybrid classes for historical multi-party communication transcript data object, such as ground-truth hybrid classes defined by a subject matter expert and/or by a superior hybrid space classification machine learning model whose operational computational complexity is higher than the operational computational complexity of the hybrid space classification machine learning model for which ground-truth training data is being generated.

The term "summarization template" may refer to a data construct that describes an ordered sequence of summarization template, where each summarization template may either be a template static text segment or a template dynamic data field. A template static text segment may be a defined text string, while a template dynamic data field may be a missing data value designator that is associated with a data field type. An example of a template static text segment may be the string "the caller's name is:", while an example of a template dynamic data field may be a missing data value designator that immediately follows the noted string and is associated with a "full_name" data field type. As described above, in some embodiments, each hybrid class defined by a hybrid classification space for a hybrid classification space machine learning model is associated with a respective and distinct summarization template, and thus the assigned hybrid class for a particular multi-party communication transcript data object as generated by the hybrid classification space can also be used to assign a summarization template, namely the respective and distinct summarization template for the assigned hybrid class, to the multi-party communication transcript data object. In some embodiments, to generate the summarization template for a particular hybrid class, the following operations are performed: (i) identifying the related qualified multi-party communication documentation data object set for the particular hybrid class, (ii) detecting (e.g., based at least in part on subject-matter-expert-provided quality indication data, based at least in part on the output of a high quality text detection machine learning model, and/or the like) a high-quality subset of the related qualified multi-party communication documentation data object set that comprises those related qualified multi-party communication documentation data objects that are determined to be high quality, (iii) determining, in the multi-party communication documents data objects in the high-quality subset, a set of repeating segments having a threshold-satisfying frequency measure (e.g., a threshold-satisfying occurrence ratio, a threshold-satisfying term-frequency-inverse-domain-frequency score, and/or the like) across the high-quality subset that satisfies (e.g., exceeds) a higher threshold measure (e.g., a $90^{th}$ percentile frequency for a distribution of frequencies of all text segments of the high-quality subset that have a word count that is selected from a defined acceptable word count range), (iv) determining, in the multi-party communication documentation data objects in the high-quality subset, a set of high-variability segments having a threshold-failing frequency measure (e.g., a threshold-failing occurrence ratio, a threshold-failing term-frequency-inverse-domain-frequency score, and/or the like) across the high-quality subset that fails to satisfy a lower threshold measure (e.g., a $10^{th}$ percentile frequency for a distribution of frequencies of all text segments of the high-quality subset that have a word count that is selected from a defined acceptable word count range), and (v) assigning each repeating segment to a respective template static text segment as well as each high-variability segment to a respective template dynamic data field.

The term "monitored user activity data reporting application programming interface (API)" may refer to a data construct that describes an API that generates API response data describing monitored activities of a target user profile. For example, the monitored user activity data reporting API may generate API response data describing activities of an agent user profile in interacting with a particular database. In some embodiments, API response mapping data associated with the monitored user activity data reporting API may map template dynamic data fields of summarization templates to particular data fields of an API schema of the monitored user activity data reporting API using API response mapping data. For example, the API response mapping data may map a birthdate dynamic data field to a "birthday" field of API response data associated with the noted API. An example of a monitored user activity data reporting API is the Maestro API.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes a predictive data analysis system 101 configured to receive predictive data analysis requests from monitored end user computing entities 102, process the predictive data analysis requests to generate predictions based at least in part on data received from application server computing entities, provide the generated predictions to the monitored end user computing entities 102, and automatically perform prediction-based actions based at least in part on the generated predictions. An example of a prediction-based action that can be performed using the predictive data analysis system 101 is a request for generating a summarization for a call transcript document.

In some embodiments, predictive data analysis system 101 may communicate with at least one of the monitored end user computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more monitored end user computing entities 102, process the predictive data analysis requests to generate predictions corresponding to the predictive data analysis requests, provide the generated predictions to the monitored end user computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In some embodiments, the predictions generated by the predictive data analysis computing entity 106 comprise one or more summarizations generated by mapping data field values of a monitored user activity data reporting API associated with a target database to template dynamic data fields of a summarization template. In some of the note embodiments, the target database is stored on and/or the monitored user activity data reporting API is executed on an application server computing entity 109. For example, in some embodiments, the application server computing entity 109 provides a software application that enables call center agents to access a target database (e.g., a health insurance member data database), and a monitored user activity data reporting API is provided by the application server computing entity 109 to provide access to API response data describing interactions of the call center agent with the provided software application and/or with the target database. An example of the monitored user activity data reporting API is the Maestro API. In some embodiments, a monitored end user computing entity 102 is used by a user profile whose interactions with the software application and/or with the target database are monitored. For example, the monitored end user computing entity 102 may be a computing entity used by a call center agent.

A. Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

B. Exemplary Monitored End User Computing Entity

FIG. 3 provides an illustrative schematic representative of a monitored end user computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Monitored end user computing entities 102 can be operated by various parties. As shown in FIG. 3, the monitored end user computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the monitored end user computing entity 102 may be capable of operating with one or more air interface standards, communication protocols, modulation types, and access types. More particularly, the monitored end user computing entity 102 may operate in accordance with any of a number of wireless communication standards and protocols, such as those described above with regard to the predictive data analysis computing entity 106. In a particular embodiment, the monitored end user computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the monitored end user computing entity 102 may operate in accordance with multiple wired communication standards and protocols, such as those described above with regard to the predictive data analysis computing entity 106 via a network interface 320.

Via these communication standards and protocols, the monitored end user computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The monitored end user computing entity 102 can also download changes, add-ons, and updates, for instance, to its firmware, software (e.g., including executable instructions, applications, program modules), and operating system.

According to one embodiment, the monitored end user computing entity 102 may include location determining aspects, devices, modules, functionalities, and/or similar words used herein interchangeably. For example, the monitored end user computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the monitored end user computing entity's 102 position in connection with a variety of other systems, including cellular towers, Wi-Fi access points, and/or the like. Similarly, the monitored end user computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The monitored end user computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the monitored end user computing entity 102 to interact with and/or cause display of information/data from the predictive data analysis computing entity 106, as described herein. The user input interface can comprise any of a number of devices or interfaces allowing the monitored end user computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the monitored end user computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The monitored end user computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the monitored end user computing entity 102. As indicated, this may include a user application that is resident on the entity or accessible through a browser or other user interface for communicating with the predictive data analysis computing entity 106 and/or various other computing entities.

In another embodiment, the monitored end user computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the monitored end user computing entity 102 may be embodied as an artificial intelligence (AI) computing entity, such as an Amazon Echo, Amazon Echo Dot, Amazon Show, Google Home, and/or the like. Accordingly, the monitored end user computing entity 102 may be configured to provide and/or receive information/data from a user via an input/output mechanism, such as a display, a camera, a speaker, a voice-activated input, and/or the like. In certain embodiments, an A1 computing entity may comprise one or more predefined and executable program algorithms stored within an onboard memory storage module, and/or accessible over a network. In various embodiments, the A1 computing entity may be configured to retrieve and/or execute one or more of the predefined program algorithms upon the occurrence of a predefined trigger event.

C. Exemplary Application Server Computing Entity

FIG. 4 provides a schematic of an application server computing entity 109 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the application server computing entity 109 may also include one or more communications interfaces 420 for communicating with various computing entities, such as by communicating data, content, information, and/or similar terms used herein interchangeably that can be transmitted, received, operated on, processed, displayed, stored, and/or the like.

As shown in FIG. 4, in one embodiment, the application server computing entity 109 may include, or be in communication with, one or more processing elements 405 (also referred to as processors, processing circuitry, and/or similar terms used herein interchangeably) that communicate with other elements within the application server computing entity 109 via a bus, for example. As will be understood, the processing element 405 may be embodied in a number of different ways.

For example, the processing element 405 may be embodied as one or more complex programmable logic devices (CPLDs), microprocessors, multi-core processors, coprocessing entities, application-specific instruction-set processors (ASIPs), microcontrollers, and/or controllers. Further, the processing element 405 may be embodied as one or more other processing devices or circuitry. The term circuitry may refer to an entirely hardware embodiment or a combination of hardware and computer program products. Thus, the processing element 405 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 405 may be configured for a particular use or configured to execute instructions stored in volatile or non-volatile media or otherwise accessible to the processing element 405. As such, whether configured by hardware or computer program products, or by a combination thereof, the processing element 405 may be capable of performing steps or operations according to embodiments of the present invention when configured accordingly.

In one embodiment, the application server computing entity 109 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 410, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the application server computing entity 109 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 415, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 405. Thus, the databases, database instances, database management systems, data, applications, programs, program modules, scripts, source code, object code, byte code, compiled code, interpreted code, machine code, executable instructions, and/or the like may be used to control certain aspects of the operation of the application server computing entity 109 with the assistance of the processing element 405 and operating system.

As indicated, in one embodiment, the application server computing entity 109 may also include one or more communications interfaces 420 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the application server computing entity 109 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the application server computing entity 109 may include, or be in communication with, one or more input elements, such as a keyboard input, a mouse input, a touch screen/display input, motion input, movement input, audio input, pointing device input, joystick input, keypad input, and/or the like. The application server computing entity 109 may also include, or be in communication with, one or more output elements (not shown), such as audio output, video output, screen/display output, motion output, movement output, and/or the like.

V. Exemplary System Operations

As described below, various embodiments of the present invention disclose techniques for improving storage efficiency of multi-party communication transcript data object storage systems. As described herein, various embodiments of the present invention disclose techniques for generating summarizations of multi-party communication transcript data object using summarization templates that are mapped to hybrid classes of a hybrid classification space for a hybrid classification machine learning model. Because a summarization of a multi-party communication transcript data object is smaller in size than the underlying multi-party communication transcript data object (as the summarization includes subsets of words/sentences of the underlying multi-party communication transcript data object), various embodiments of the present invention enable storing summarizations of multi-party communication transcript data object instead of the document data objects that are bigger in size. In this way, various embodiments of the present invention reduce storage requirements associated with storing multi-party communication transcript data object data, and thus increase storage efficiency of storing multi-party communication transcript data object data associated with multi-party communication transcript data objects. Accordingly, by generating summarizations of multi-party communication transcript data objects that comprise a selected subset of each multi-party communication transcript data object, various embodiments of the present invention disclose techniques for improving storage efficiency of various multi-party communication transcript data object storage systems.

Moreover, as further described below, various embodiments of the present invention make important technical contributions to improving predictive accuracy of natural language processing machine learning models that are configured to perform natural language processing operations on multi-party communication transcript data objects by using summarization templates that are mapped to hybrid classes of a hybrid classification space for a hybrid classification machine learning model. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., Feature-Frequency-Adaptive On-line Training for Fast and Accurate Natural Language Processing in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improving efficiency and speed of training natural language processing machine learning models, thus reducing the number of computational operations needed and/or the amount of training data entries needed to train natural language processing machine learning models. Accordingly, the techniques described herein improve at least one of the computational efficiency, storage-wise efficiency, and speed of training natural language processing machine learning models.

FIG. 5 is a flowchart diagram of an example process 500 for generating a guided summary for a multi-party communication transcript data object. Via the various steps/operations of the process 500, the predictive data analysis computing entity 106 can generate a summary for a multi-party communication transcript data object using a summarization template that is generated/selected based at least in part on a classification for the multi-party communication transcript data object. However, while various embodiments of the present invention describe using techniques of the process 500 to generate guided summaries for multi-party communication transcript data object, a person of ordinary skill in the relevant technology will recognize that the disclosed techniques can be used to generate guided summaries for other non-transcript document data objects, such as for document data objects that describe text data associated with medical documents, contract documents, tutorial documents, and/or the like.

The process 500 begins at step/operation 501 when the predictive data analysis computing entity 106 identifies (e.g., retrieves, receives, generates, and/or the like) the multi-party communication transcript data object. In some embodiments, the predictive data analysis computing entity 106 receives the multi-party communication transcript data object as a text file from a transcript storage server system. In some embodiments, the predictive data analysis computing entity 106 receives a multi-party communication audio data object as an audio file from an audio storage server system and generates the corresponding multi-party communication transcript data object by performing one or more text-to-speech transformation/conversion operations on the received multi-party communication audio data object. In some embodiments, the predictive data analysis computing entity 106 retrieves the multi-party communication transcript data object from a local storage medium that is associated with the predictive data analysis computing entity 106, such as from the storage subsystem 108 of the predictive data analysis system 101.

In some embodiments, the multi-party communication transcript data object comprises text data describing communications between two or more parties during a particular communication session (e.g., during a particular call, during a particular videoconference, during a particular text messaging session, and/or the like). An operational example of a multi-party communication transcript data object 600 is depicted in FIG. 6A. As depicted in FIG. 6A, the multi-party communication transcript data object 600 comprises communications between a call center agent party and a call center service requester party. In some embodiments, the multi-party communication transcript data object 600 may be generated by performing text-to-speech transformation/conversion operations on an audio file containing audio data associated with a call between the call center agent part and the call center service requester party. Another operational example of a multi-party communication transcript data object 700 is depicted in FIG. 6B.

Returning to FIG. 5, at step/operation 502, the predictive data analysis computing entity 106 generates a hybrid class for the multi-party communication transcript data object. As described below, a hybrid class for a multi-party communication transcript data object may be a class/category for the multi-party communication transcript data object that is generated based at least in part on two or more underlying predicted classes for the multi-party communication transcript data object, such as a primary class that describes a top-level reason code for the multi-party communication transcript data object and a secondary class that describes a bottom-level additional context code for the multi-party communication transcript data object. However, while various embodiments of the present invention describe generating guided summarizations based at least in part on hybrid classes, a person of ordinary skill in the relevant technology will recognize that, in some embodiments, a guided summarization for a document data object may be generated based at least in part on a non-hybrid class for the document data object that is generated based at least in part on only one underlying predicted class for the document data object.

In some embodiments, a hybrid class describes an assigned class/category for a multi-party communication transcript data object that is determined based at least in part on C underlying predicted class for the multi-party communication transcript data object, wherein C may be a value that is defined by configuration hyperparameters of a hybrid space classification machine learning model that is used to generate hybrid classes for input multi-party communication transcript data object. For example, when C=2, then the hybrid class for a multi-party communication transcript data object may be determined (e.g., may be a pair comprising) a primary class for the multi-party communication transcript data object (e.g., a primary class that describes a top-level call reason code for the multi-party communication transcript data object) and a secondary class for the multi-party communication transcript data object (e.g., a secondary class that describes a bottom-level additional context code for the multi-party communication transcript data object).

In some embodiments, the hybrid class for a multi-party communication transcript data object is a C-sized tuple comprising C values, where each cth value of the C values describes a cth-level predicted underlying class for the multi-party communication transcript data object that is selected from a c-th level classification space describing a set of defined candidate c-th level that may be assigned to a particular multi-party communication transcript data object. For example, given C=2, the first-level classification space may define a set of candidate top-level reason codes that may be assigned to the multi-party communication transcript data objects, the second-level classification space may define a set of candidate bottom-level additional contexts that may be assigned to the multi-party communication transcript data objects, and the hybrid class for a particular multi-party communication transcript data object is a 2-sized tuple (i.e., an ordered pair), where the first value of the 2-sized tuple describes a selected candidate top-level reason code from the first-level classification space that is assigned to the particular multi-party communication transcript data object, and the second value of the 2-sized tuple describes a selected bottom-level additional context code from the second-level classification space that is assigned to the particular multi-party communication transcript data object.

In some embodiments, the hybrid class for a multi-party communication transcript data object is selected from a hybrid classification space that describes a set of all hybrid classes that may be assigned to multi-party communication transcript data object. In some embodiments, the number of hybrid classes defined by a hybrid classification space describes how many cross-level hierarchical dependencies exist between the C classification levels associated with the hybrid classification space. In some embodiments, given a set of C independent and non-hierarchical classification levels associated with a hybrid classification space, where each cth classification level is associated with a cth-level classification schema that defines $N_c$ cth-level classes that may be assigned to multi-party communication transcript data objects as selected/assigned cth-level classes, then the hybrid classification space defines/comprises $\Pi_{i=1}^{c} N_c$. For example, given C=2, where the first-level classification schema comprises two top-level reason codes R1 and R2 and the second-level classification schema comprises four bottom-level additional context codes A1, A2, A3, and A4, then the hybrid class comprises the following 2*4=8 hybrid classes: a hybrid class corresponding to the ordered pair (R1, A1), a hybrid class corresponding to the ordered pair (R1, A2), a hybrid class corresponding to the ordered pair (R1, A3), a hybrid class corresponding to the ordered pair (R1, A4), a hybrid class corresponding to the ordered pair (R2, A1), a hybrid class corresponding to the ordered pair (R2, A2), a hybrid class corresponding to the ordered pair (R2, A3), and a hybrid class corresponding to the ordered pair (R2, A4).

However, if there are hierarchical dependency relationships between the C classification levels associated with a hybrid classification space, such that for example the assigned/selected cth-level class for a multi-party communication transcript data object can be used to generate/filter/select an applicable (c+1)th-level classification space for the multi-party communication transcript data object that comprises less than all of the defined candidate (c+1)th-level classes in the (c+1)th-level classification schema, then the hybrid classification space defines/comprises less than $\Pi_{i=1}^{c} N_c$ defined hybrid classes, where each $N_c$ value is the count of cth-level underlying classes defined by the cth-level classification schema for a cth classification level associated with the hybrid classification space. For example, given C=2, where the first-level classification schema comprises two top-level reason codes R1 and R2 and the second-level classification schema comprises four bottom-level additional context codes A1, A2, A3, and A4, if A1 and A2 can only be assigned to a multi-party communication transcript data object if R1 is already assigned to the multi-party communication transcript data object, and further if A3 and A4 can only be assigned to a multi-party communication transcript data object if R1 is already assigned to the multi-party communication transcript data object, then the hybrid classification space comprises the following four hybrid class: a hybrid class corresponding to the ordered pair (R1, A1), a hybrid class corresponding to the ordered pair (R1, A2), a hybrid class corresponding to the ordered pair (R2, A3), and a hybrid class corresponding to the ordered pair (R2, A4).

In some embodiments, given C=2, a corresponding hybrid classification space comprises a primary classification space associated with a first classification level and a secondary classification space associated with a second classification level. If the relationship between the two classification levels is hierarchically-dependent such that the first classification level is the hierarchical parent/superior of the second classification level, then each primary class is associated with a respective secondary classification space defines a set of defined secondary classes that are assigned to a particular multi-party communication transcript data object if the particular primary class is already assigned to the particular multi-party communication transcript. Operational examples of hybrid classification spaces where there is a hierarchical dependency relationship between a first classification level (i.e., a reason code classification level) and a second classification level (e.g., an additional context code classification level) are depicted in FIG. 7.

In some embodiments, a hybrid class defined by a hybrid classification space is associated with a summarization template that is generated based at least in part on lexical and semantic patterns associated with historical multi-party communication transcript data objects that are predicted to be associated with a hybrid class. In some of the noted embodiments, given C classification levels, a C-sized tuple is only assigned to a hybrid class if the number of historical multi-party communication data objects that are predicted to be associated with the underlying predicted classes described by the C-sized tuple. For example, in an exemplary embodiment, given C=2 classification levels comprising a first classification level associated with A first-level classes and B second-level classes, the following operations may be performed: (i) A*B initial hybrid classes are defined, comprising each pairwise combination of the A first-level classes and the B second-level classes, (ii) an initially-trained hybrid classification space machine learning model (whose output space comprises all of the A*B initial hybrid classes) is used to generate, for each historical multi-party communication transcript data object, an assigned/predicted initial hybrid class that is selected from the A*B initial hybrid classes defined in (i), (iii) for each initial hybrid class, a prediction count is generated that describes the number of historical multi-party communication transcript data objects that are assigned the initial hybrid classes, (iv) a hybrid classification space is generated by excluding, from the set of A*B initial hybrid classes, those initial hybrid classes that are associated with non-threshold-satisfying prediction counts, and (v) a new hybrid classification space machine learning model is generated whose output space is generated based at least in part on the hybrid classification space (e.g., whose output space comprises all of the hybrid classes in the hybrid classification space, whose output space comprises all of the hybrid classes in the hybrid class cation space plus an "undefined" class, and/or the like).

In some embodiments, the hybrid class for a multi-party communication transcript data object may be generated by a hybrid classification space machine learning model. In some embodiments, a hybrid classification space machine learning model is configured to generate, for an input multi-party communication transcript data object, a hybrid class that is selected from a hybrid classification space for the hybrid classification machine learning model. In some embodiments, the hybrid classification space machine learning model comprises an encoding layer (e.g., an attention-based encoding layer) and a classification layer, where the encoding layer is configured to process the input multi-party communication transcript data object to generate a fixed-size embedded representation of the multi-party communication transcript data object, while the classification layer is configured to process the fixed-size embedded representation of the multi-party communication transcript data object to map the multi-party communication transcript data object to a mapped hybrid class defined by the hybrid classification space. An example of a hybrid classification space machine learning model is the A1 Call Center Agent (ACC) machine learning model. In some embodiments, the hybrid classification space for a hybrid classification space machine learning model is provided as configuration hyperparameter data for the noted hybrid classification space machine learning model.

In some embodiments, inputs to a hybrid classification space machine learning model comprise, for a given input multi-party communication transcript data object, a file containing text data associated with the given input multi-party communication transcript data object, and/or a vector containing an initial representation (e.g., a one-hot-coded representation, a bag-of-words representation, a Paragraph2Vec representation, and/or the like) of the given input multi-party communication transcript data object. In some embodiments, outputs of a hybrid classification space machine learning model comprise, for a given input multi-party communication transcript data object, C vectors, where each cth vector is associated with a respective cth classification level, has the size $N_c$ which describes the number of cth-level classes defined by the cth-level classification schema for the respective cth classification level, and describes, for each cth-level class defined by the cth-level classification schema, a predicted likelihood that the given input multi-party communication transcript data object should be assigned the particular cth level class. In some embodiments, the hybrid classification space machine learning model is trained using ground-truth hybrid classes for historical multi-party communication transcript data object, such as ground-truth hybrid classes defined by a subject matter expert and/or by a superior hybrid space classification machine learning model whose operational computational complexity is higher than the operational computational complexity of the hybrid space classification machine learning model for which ground-truth training data is being generated.

Returning to FIG. 5, at step/operation 503, the predictive data analysis computing entity 106 determines a summarization template for the multi-party communication transcript data object. In some embodiments, each hybrid class defined by a hybrid classification space for a hybrid classification space machine learning model is associated with a respective and distinct summarization template, and thus the assigned hybrid class for a particular multi-party communication transcript data object as generated by the hybrid classification space can also be used to assign a summarization template, namely the respective and distinct summarization template for the assigned hybrid class, to the multi-party communication transcript data object.

In some embodiments, a summarization template describes an ordered sequence of summarization template, where each summarization template may either be a template static text segment or a template dynamic data field. A template static text segment may be a defined text string, while a template dynamic data field may be a missing data value designator that is associated with a data field type. An example of a template static text segment may be the string "the caller's name is:", while an example of a template dynamic data field may be a missing data value designator that immediately follows the noted string and is associated with a "full_name" data field type. As described above, in some embodiments, each hybrid class defined by a hybrid classification space for a hybrid classification space machine learning model is associated with a respective and distinct summarization template, and thus the assigned hybrid class for a particular multi-party communication transcript data object as generated by the hybrid classification space can also be used to assign a summarization template, namely the respective and distinct summarization template for the assigned hybrid class, to the multi-party communication transcript data object.

An operational example of a summarization template 800 is depicted in FIG. 8. As depicted in FIG. 8, the summarization template 800 with template static text segments, such as the template static text segment 801, as well as template dynamic data fields, such as the template dynamic data field 802. As depicted in FIG. 8, the template dynamic data fields of the summarization template are depicted using the designator symbol (_) and are associated with respective data field type. For example, the template dynamic data field 802 is associated with the "date_of_service" data field type.

In some embodiments, by using summarization templates, a proposed summarization framework is able to vastly reduce the computational complexity of performing summarization on an input document data object, such as an input multi-party communication transcript data object, by defining the set of dynamic data fields that apply to the input document data object based at least in part on an assigned class/category of the input document data object. For example, consider an exemplary embodiment in which a summarization framework is used to process document data objects associated with G defined classes/categories to generate summarizations for the noted document data objects. In this exemplary embodiment, if the related dynamic data fields for the G defined classes/categories include F dynamic data fields, and if extracting each dynamic data field for a particular document data object has a computational complexity of $O(E)$, then extracting the dynamic data fields for the particular document data object has a computational complexity of $O(EF)$. In contrast, using various embodiments of the present invention, a proposed summarization framework first assigns a gth class/category to the particular document data object, and then identifies an $F_g$-sized subset of the F dynamic data fields that include only those dynamic data field that are associated with the gth class/category. In this way, the proposed summarization framework extracts the required dynamic data fields for the particular data object with a computational complexity of $O(EF_g)$. Because $F_g<F$, and typically $F_g<<F$, then $O(EF_g)<O(EF)$. Accordingly, by defining the set of dynamic data fields that apply to an input document data object based at least in part on an assigned class/category of the input document data object, various embodiments of the present invention reduce the computational complexity of performing summarization on the input document data object and improve operational/computational efficiency of performing summarization on the input document data object.

In some embodiments, given a set of H hybrid classes defined by the hybrid classification space of a hybrid classification space machine learning model, H summarization templates, with each summarization template being a respective summarization template for those multi-party communication data objects that are associated with a particular hybrid class. In some embodiments, generating the H summarization templates for a hybrid classification space comprising H hybrid classes is performed in accordance with the process 900 that is depicted in FIG. 9. As depicted in FIG. 9, the depicted process 900 begins when a set of T multi-party communication documentation data objects 901 are received and, for each received multi-party communication documentation data object, a hybrid class is generated using a hybrid classification machine learning model. Accordingly, the hybrid classification machine learning model generates T hybrid classes 902, each being the respective hybrid class for a particular multi-party communication documentation data object that is selected from a hybrid classification space defining/comprising H hybrid classes.

As further depicted in FIG. 9, once the T hybrid classes 902 are generated, the T multi-party communication documentation data objects 901 are filtered in accordance with one or more documentation data object criteria to generate a set of qualified multi-party communication documentation data objects 903. In some embodiments, a qualified multi-party communication documentation data object is a documentation file (e.g., a documentation agent created by a cell center agent) for a multi-party communication transcript data object that satisfies the one or more documentation data object criteria. Examples of the one or more documentation data object criteria include a length criterion that excludes any multi-party communication documentation data object whose length measure (e.g., word count) fails to satisfy (e.g., falls below) a length threshold, a keyword presence criterion that excludes any multi-party communication documentation data object that fail to include a required ratio (e.g., all of) a set of quality-indicating keywords, and/or the like.

Accordingly, once the set of qualified multi-party communication documentation data objects 903 are generated, each hybrid class of the H hybrid classes defined by a hybrid classification space is associated with a related qualified multi-party communication documentation data object set that comprises a subset of the set of qualified multi-party communication documentation data objects 903 that are assigned the particular hybrid class. Subsequently, for each hybrid class of the H hybrid classes, a respective summarization template is generated based at least in part on the related qualified multi-party communication documentation data object set for the hybrid class. Accordingly, H summarization templates 904 are generated, with each summarization template being associated with a respective hybrid class and being generated based at least in part on the related qualified multi-party communication documentation data object set for the noted respective hybrid class.

In some embodiments, to generate the summarization template for a particular hybrid class, the following operations are performed: (i) identifying the related qualified multi-party communication documentation data object set for the particular hybrid class, (ii) detecting (e.g., based at least in part on subject-matter-expert-provided quality indication data, based at least in part on the output of a high quality text detection machine learning model, and/or the like) a high-quality subset of the related qualified multi-party communication documentation data object set that comprises those related qualified multi-party communication documentation data objects that are determined to be high quality, (iii) determining, in the multi-party communication documentation data objects in the high-quality subset, a set of repeating segments having a threshold-satisfying frequency measure (e.g., a threshold-satisfying occurrence ratio, a threshold-satisfying term-frequency-inverse-domain-frequency score, and/or the like) across the high-quality subset that satisfies (e.g., exceeds) a higher threshold measure (e.g., a $90^{th}$ percentile frequency for a distribution of frequencies of all text segments of the high-quality subset that have a word count that is selected from a defined acceptable word count range), (iv) determining, in the multi-party communication documentation data objects in the high-quality subset, a set of high-variability segments having a threshold-failing frequency measure (e.g., a threshold-failing occurrence ratio, a threshold-failing term-frequency-inverse-domain-frequency score, and/or the like) across the high-quality subset that fails to satisfy a lower threshold measure (e.g., a $10^{th}$ percentile frequency for a distribution of frequencies of all text segments of the high-quality subset that have a word count that is selected from a defined acceptable word count range), and (v) assigning each repeating segment to a respective template static text segment as well as each high-variability segment to a respective template dynamic data field.

In some embodiments, to generate the summarization template for a particular hybrid class, the following operations are performed: (i) identifying the related qualified multi-party communication documentation data object set for the particular hybrid class, (ii) detecting (e.g., based at least in part on subject-matter-expert-provided quality indication data, based at least in part on the output of a high quality text detection machine learning model, and/or the like) a high-quality subset of the related qualified multi-party communication documentation data object set that comprises those related qualified multi-party communication documentation data objects that are determined to be high quality, (iii) determining, in the multi-party communication documentation data objects in the high-quality subset, a set of repeating segments having a threshold-satisfying frequency measure (e.g., a threshold-satisfying occurrence ratio, a threshold-satisfying term-frequency-inverse-domain-frequency score, and/or the like) across the high-quality subset that satisfies (e.g., exceeds) a higher threshold measure (e.g., a $90^{th}$ percentile frequency for a distribution of frequencies of all text segments of the high-quality subset that have a word count that is selected from a defined acceptable word count range), (iv) determining, in the multi-party communication documentation data objects in the high-quality subset, a set of database-matching segments that correspond to database fields of a database schema a target database, such as a member healthcare data database, and (v) assigning each repeating segment to a respective template static text segment as well as each database matching segment to a respective template dynamic data field. In some of the noted embodiments, determining the database matching segments is performed using a set of per-field data matching machine learning models each corresponding to a database field type of a database schema a target database, such as a member healthcare data database, where each per-field data matching machine learning model is configured to process a text segment to determine whether the text segment relates to the corresponding database field of the per-field data matching machine learning model.

In some embodiments, to generate the summarization template for a particular hybrid class, the following operations are performed: (i) identifying the related qualified multi-party communication documentation data object set for the particular hybrid class, (ii) detecting (e.g., based at least in part on subject-matter-expert-provided quality indication data, based at least in part on the output of a high quality text detection machine learning model, and/or the like) a high-quality subset of the related qualified multi-party communication documentation data object set that comprises those related qualified multi-party communication documentation data objects that are determined to be high quality, (iii) determining, in the multi-party communication documentation data objects in the high-quality subset, a set of repeating segments having a threshold-satisfying frequency measure (e.g., a threshold-satisfying occurrence ratio, a threshold-satisfying term-frequency-inverse-domain-frequency score, and/or the like) across the high-quality subset that satisfies (e.g., exceeds) a higher threshold measure (e.g., a $90^{th}$ percentile frequency for a distribution of frequencies of all text segments of the high-quality subset that have a word count that is selected from a defined acceptable word count range), (iv) determining, in the multi-party communication documentation data objects in the high-quality subset, a set of high-variability segments having a threshold-failing frequency measure (e.g., a threshold-failing occurrence ratio, a threshold-failing term-frequency-inverse-domain-frequency score, and/or the like) across the high-quality subset that fails to satisfy a lower threshold measure (e.g., a $10^{th}$ percentile frequency for a distribution of frequencies of all text segments of the high-quality subset that have a word count that is selected from a defined acceptable word count range), (v) determining, in the multi-party communication documentation data objects in the high-quality subset, a set of database-matching segments that correspond to database fields of a database schema a target database, such as a member healthcare data database, and (v) assigning each repeating segment to a respective template static text segment, each high-variability segment to a respective template dynamic data field, and each database matching segment to a respective template dynamic data field.

In some embodiments, to generate a summarization template for a hybrid class, the following operations are performed: (i) identifying the related qualified multi-party communication documentation data object set for the particular hybrid class, (ii) detecting (e.g., based at least in part on subject-matter-expert-provided quality indication data, based at least in part on the output of a high quality text detection machine learning model, and/or the like) a high-quality subset of the related qualified multi-party communication documentation data object set that comprises those related qualified multi-party communication documentation data objects that are determined to be high quality, (iii) providing the high-quality subset along with standard operating procedure (SOP) data to a subject matter expert (SME) and enabling the SME to mark, within the qualified multi-party communication documentation data objects in the high-quality subset, template dynamic data fields and/or template static text segments, and (iv) generating the summarization template based at least in part on the SME-provided markups.

Returning to FIG. 5, at step/operation 504, the predictive data analysis computing entity 106 generates, for each template dynamic data field of the summarization template that is selected/determined in step/operation 503, a respective predicted data field value. In some embodiments, the predictive data analysis computing entity 106 generates a set of D predicted data field values, each being associated with a respective template dynamic data field of D template dynamic data fields of the summarization template for the multi-party communication transcript data object. In some of the noted embodiments, the predictive data analysis computing entity 106 generates the noted D predicted data field values based at least in part on monitored user activity data for a monitored end user associated with the multi-party communication transcript data object during a communication time period.

In some embodiments, the monitored user activity data is generated using a user activity monitoring software that executes on an application server computing entity that the monitored end user interacts with via a networked connection with an end user computing entity and is extracted via a monitored user activity data reporting application programming interface (API) that is executed by the application server computing entity. In some embodiments, each template dynamic data field is mapped to a schema segment of an API schema of the monitored user activity data reporting API using API response mapping data.

In some embodiments, the monitored user activity data reporting application programming interface (API) generates API response data describing monitored activities of a target user profile. For example, the monitored user activity data reporting API may generate API response data describing activities of an agent user profile in interacting with a particular database. In some embodiments, API response mapping data associated with the monitored user activity data reporting API may map template dynamic data fields of summarization templates to particular data fields of an API schema of the monitored user activity data reporting API using API response mapping data. For example, the API response mapping data may map a birthdate dynamic data field to a "birthday" field of API response data associated with the noted API.

In some embodiments, the predictions generated by the predictive data analysis computing entity 106 comprise one or more summarizations generated by mapping data field values of a monitored user activity data reporting API associated with a target database to template dynamic data fields of a summarization template. In some of the note embodiments, the target database is stored on and/or the monitored user activity data reporting API is executed on an application server computing entity 109. For example, in some embodiments, the application server computing entity 109 provides a software application that enables call center agents to access a target database (e.g., a health insurance member data database), and a monitored user activity data reporting API is provided by the application server computing entity 109 to provide access to API response data describing interactions of the call center agent with the provided software application and/or with the target database. An example of the monitored user activity data reporting API is the Maestro API.

At step/operation 505, the predictive data analysis computing entity 106 generates the guided summary. In some embodiments, the guided summary comprises the static text segments of the selected summarization template along with the predicted data field values generated in step/operation 504. In some embodiments, to generate the guided summary, the predictive data analysis computing entity 106 inserts the predicted data field values into appropriate segments of the selected summarization template.

At step/operation 506, the predictive data analysis computing entity 106 performs one or more prediction-based actions based at least in part on the summarization. In some embodiments, performing the prediction-based actions comprises generating display data for a prediction output user interface that displays the summary for a selected multi-party communication transcript data object, such as the prediction output user interface 1000 of FIG. 10 that displays the summary for the multi-party communication transcript data object 600 of FIG. 6A.

Other examples of prediction-based actions include performing operational load balancing for post-prediction systems by using summarizations to set the number of allowed computing entities used by the noted post-prediction systems. For example, in some embodiments, a predictive data analysis computing entity determines D transcript classifications for D multi-party communication transcript data objects based at least in part on the D summarizations for the D multi-party communication transcript data objects. Then, the count of multi-party communication transcript data objects that are associated with an affirmative transcript classification, along with a resource utilization ratio for each multi-party communication transcript data object, can be used to predict a predicted number of computing entities needed to perform post-prediction processing operations (e.g., automated investigation operations) with respect to the D multi-party communication transcript data objects. For example, in some embodiments, the number of computing entities needed to perform post-prediction processing operations (e.g., automated investigation operations) with respect to D multi-party communication transcript data objects can be determined based at least in part on the output of the equation: $R = \text{ceil}(\Sigma_k^{k=K} ur_k)$, where R is the predicted number of computing entities needed to perform post-prediction processing operations with respect to the D multi-party communication transcript data objects, ceil(•) is a ceiling function that returns the closest integer that is greater than or equal to the value provided as the input parameter of the ceiling function, k is an index variable that iterates over multi-party communication transcript data objects among the D multi-party communication transcript data objects that are associated with affirmative transcript classifications, and $ur_k$ is the estimated resource utilization ratio for a kth multi-party communication transcript data object that may be determined based at least in part on a count of utterances/tokens/words in the kth multi-party communication transcript data object. In some embodiments, once R is generated, the predictive data analysis computing entity can use R to perform operational load balancing for a server system that is configured to perform post-prediction processing operations (e.g., automated investigation operations) with respect to the D multi-party communication transcript data objects. This may be done by allocating computing entities to the post-prediction processing operations if the number of currently allocated computing entities is below R, and deallocating currently allocated computing entities if the number of currently allocated computing entities is above R.

Accordingly, as described above, various embodiments of the present invention disclose techniques for improving storage efficiency of multi-party communication transcript data object storage systems. As described herein, various embodiments of the present invention disclose techniques for generating summarizations of multi-party communication transcript data object using summarization templates that are mapped to hybrid classes of a hybrid classification space for a hybrid classification machine learning model. Because a summarization of a multi-party communication transcript data object is smaller in size than the underlying multi-party communication transcript data object (as the summarization includes subsets of words/sentences of the underlying multi-party communication transcript data object), various embodiments of the present invention enable storing summarizations of multi-party communication transcript data object instead of the document data objects that are bigger in size. In this way, various embodiments of the present invention reduce storage requirements associated with storing multi-party communication transcript data object data, and thus increase storage efficiency of storing multi-party communication transcript data object data associated with multi-party communication transcript data objects. Accordingly, by generating summarizations of multi-party communication transcript data objects that comprise a selected subset of each multi-party communication transcript data object, various embodiments of the present invention disclose techniques for improving storage efficiency of various multi-party communication transcript data object storage systems.

Moreover, as further described above, various embodiments of the present invention make important technical contributions to improving predictive accuracy of natural language processing machine learning models that are configured to perform natural language processing operations on multi-party communication transcript data objects by using summarization templates that are mapped to hybrid classes of a hybrid classification space for a hybrid classification machine learning model. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., Feature-Frequency-Adaptive On-line Training for Fast and Accurate Natural Language Processing in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improving efficiency and speed of training natural language processing machine learning models, thus reducing the number of computational operations needed and/or the amount of training data entries needed to train natural language processing machine learning models. Accordingly, the techniques described herein improve at least one of the computational efficiency, storage-wise efficiency, and speed of training natural language processing machine learning models.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for generating a guided summary for a multi-party communication transcript data object, the computer-implemented method comprising:
    generating, using one or more processors and based at least in part on the multi-party communication transcript data object and using a hybrid space classification machine learning model, a hybrid class for the multi-party communication transcript data object that comprises a primary class for the multi-party communication transcript data object and a secondary class for the multi-party communication transcript data object, wherein: (i) the primary class is selected from a primary classification space, and (ii) the secondary class is selected from a secondary classification space that is distinct from the primary classification space;
    generating, using the one or more processors and based at least in part on the hybrid class, a summarization template for the multi-party communication transcript data object, wherein the summarization template defines: (i) a plurality of template static text segments associated with the hybrid class, and (ii) a plurality of template dynamic data fields;
    generating, using the one or more processors and based at least in part on monitored user activity data for a monitored end user associated with the multi-party communication transcript data object during a communication time period, one or more predicted data field values for the plurality of template dynamic data fields;
    generating, using the one or more processors and based at least in part on the summarization template and the one or more predicted data field values, the guided summary; and
    performing, using the one or more processors, one or more prediction-based actions based at least in part on the guided summary.

2. The computer-implemented method of claim 1, wherein:
    the primary classification space comprises a plurality of defined primary classes, and
    each defined primary class of the plurality of defined primary classes is associated with a respective distinct secondary classification space that comprises a plurality of sub-classes of the defined primary class.

3. The computer-implemented method of claim 1, wherein the monitored user activity data is generated using a user activity monitoring software that executes on an application server computing entity that the monitored end user interacts with via a networked connection with an end user computing entity and is extracted via a monitored user activity data reporting application programming interface (API) that is executed by the application server computing entity.

4. The computer-implemented method of claim 3, wherein each template dynamic data field of the plurality of template dynamic data fields is mapped to a schema segment of an API schema of the monitored user activity data reporting API using API response mapping data.

5. The computer-implemented method of claim 1, wherein:
    the hybrid class is selected from a hybrid classification space that comprises a group of defined hybrid classes, and
    each defined hybrid class of the group of defined hybrid classes is associated with a respective distinct summarization template of a group of distinct summarization templates.

6. The computer-implemented method of claim 1, wherein generating a respective distinct summarization template for a particular defined hybrid class comprises:
    identifying a plurality of qualified historical multi-party communication documentation data objects for the particular defined hybrid class, wherein each qualified historical multi-party communication documentation data object of the plurality of qualified historical multi-party communication documentation data objects: (i) is predicted to be associated with the particular defined hybrid class using the hybrid space classification machine learning model, and (ii) satisfies one or more documentation data object criteria;
    generating, based at least in part on the plurality of qualified historical multi-party communication documentation data objects, a plurality of repeating segments and a plurality of high variability segments;
    generating the plurality of template static text segments in the respective distinct summarization template based at least in part on the plurality of repeating segments; and
    generating the plurality of template dynamic data fields in the respective distinct summarization template based at least in part on the plurality of high variability segments.

7. The computer-implemented method of claim 6, wherein the one or more documentation data object criteria comprise a length criterion.

8. The computer-implemented method of claim 6, wherein the one or more documentation data object criteria comprise a keyword presence criterion.

9. A system comprising one or more processors and at least one memory storing processor-executable instructions that, when executed by any one or more of the one or more processors, cause the one or more processors to perform operations comprising:
    generating, based at least in part on a multi-party communication transcript data object and using a hybrid space classification machine learning model, a hybrid class for the multi-party communication transcript data object that comprises a primary class for the multi-party communication transcript data object and a secondary class for the multi-party communication transcript data object, wherein: (i) the primary class is selected from a primary classification space, and (ii) the secondary class is selected from a secondary classification space that is distinct from the primary classification space;

generating, based at least in part on the hybrid class, a summarization template for the multi-party communication transcript data object, wherein the summarization template defines: (i) a plurality of template static text segments associated with the hybrid class, and (ii) a plurality of template dynamic data fields;

generating, based at least in part on monitored user activity data for a monitored end user associated with the multi-party communication transcript data object during a communication time period, one or more predicted data field values;

generating, based at least in part on the summarization template and the one or more predicted data field values, a guided summary; and performing one or more prediction-based actions based at least in part on the guided summary.

10. The system of claim 9, wherein:
the primary classification space comprises a plurality of defined primary classes, and
each defined primary class of the plurality of defined primary classes is associated with a respective distinct secondary classification space that comprises a plurality of sub-classes of the defined primary class.

11. The system of claim 9, wherein the monitored user activity data is generated using a user activity monitoring software that executes on an application server computing entity that the monitored end user interacts with via a networked connection with an end user computing entity and is extracted via a monitored user activity data reporting application programming interface (API) that is executed by the application server computing entity.

12. The system of claim 11, wherein each template dynamic data field of the plurality of template dynamic data fields is mapped to a schema segment of an API schema of the monitored user activity data reporting API using API response mapping data.

13. The system of claim 9, wherein:
the hybrid class is selected from a hybrid classification space that comprises a group of defined hybrid classes, and
each defined hybrid class of the group of defined hybrid classes is associated with a respective distinct summarization template of a group of distinct summarization templates.

14. The system of claim 9, wherein generating a respective distinct summarization template for a particular defined hybrid class comprises:
identifying a plurality of qualified historical multi-party communication documentation data objects for the particular defined hybrid class, wherein each qualified historical multi-party communication documentation data object of the plurality of qualified historical multi-party communication documentation data objects: (i) is predicted to be associated with the particular defined hybrid class using the hybrid space classification machine learning model, and (ii) satisfies one or more documentation data object criteria;
generating, based at least in part on the plurality of qualified historical multi-party communication documentation data objects, a plurality of repeating segments and a plurality of high variability segments;

generating the plurality of template static text segments in the respective distinct summarization template based at least in part on the plurality of repeating segments; and
generating the plurality of template dynamic data fields in the respective distinct summarization template based at least in part on the plurality of high variability segments.

15. The system of claim 14, wherein the one or more documentation data object criteria comprise a length criterion.

16. The system of claim 14, wherein the one or more documentation data object criteria comprise a keyword presence criterion.

17. One or more non-transitory computer-readable storage media storing instructions that, when executed by one or more processors, cause the one or more processors to perform operations comprising:
generating, based at least in part on a multi-party communication transcript data object and using a hybrid space classification machine learning model, a hybrid class for the multi-party communication transcript data object that comprises a primary class for the multi-party communication transcript data object and a secondary class for the multi-party communication transcript data object, wherein: (i) the primary class is selected from a primary classification space, and (ii) the secondary class is selected from a secondary classification space that is distinct from the primary classification space;

generating, based at least in part on the hybrid class, a summarization template for the multi-party communication transcript data object, wherein the summarization template defines: (i) a plurality of template static text segments associated with the hybrid class, and (ii) a plurality of template dynamic data fields;

generating, based at least in part on monitored user activity data for a monitored end user associated with the multi-party communication transcript data object during a communication time period, one or more predicted data field values;

generating, based at least in part on the summarization template and one or more predicted data field values, a guided summary; and performing one or more prediction-based actions based at least in part on the guided summary.

18. The one or more non-transitory computer-readable storage media of claim 17, wherein:
the primary classification space comprises a plurality of defined primary classes, and
each defined primary class of the plurality of defined primary classes is associated with a respective distinct secondary classification space that comprises a plurality of sub-classes of the defined primary class.

19. The one or more non-transitory computer-readable storage media of claim 17, wherein the monitored user activity data is generated using a user activity monitoring software that executes on an application server computing entity that the monitored end user interacts with via a networked connection with an end user computing entity and is extracted via a monitored user activity data reporting application programming interface (API) that is executed by the application server computing entity.

20. The one or more non-transitory computer-readable storage media of claim 19, wherein each template dynamic data field of the plurality of template dynamic data fields is mapped to a schema segment of an API schema of the monitored user activity data reporting API using API response mapping data.

\* \* \* \* \*